United States Patent
Muhle et al.

(10) Patent No.: US 7,910,668 B2
(45) Date of Patent: Mar. 22, 2011

(54) METHOD FOR ON-LINE DETERMINATION OF DEGREE OR ONSET OF RESIN STICKINESS USING ACOUSTIC DATA

(75) Inventors: Michael E. Muhle, Kingwood, TX (US); Richard B. Pannell, Kingwood, TX (US); Eric J. Markel, Kingwood, TX (US); Robert O. Hagerty, La Porte, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/774,084

(22) Filed: May 5, 2010

(65) Prior Publication Data

US 2010/0286346 A1    Nov. 11, 2010

Related U.S. Application Data

(60) Provisional application No. 61/176,661, filed on May 8, 2009.

(51) Int. Cl.
*C08F 2/36* (2006.01)
*G01K 11/22* (2006.01)
*C08F 210/16* (2006.01)

(52) U.S. Cl. .............. 526/61; 526/59; 700/269; 702/30; 374/117; 374/E11.009

(58) Field of Classification Search .................... 526/59, 526/61; 700/269; 702/30; 374/117, E11.009
See application file for complete search history.

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 7,122,607 B2 | 10/2006 | Hagerty et al. | |
| 7,774,178 B2 | 8/2010 | Pannell et al. | |

(Continued)

FOREIGN PATENT DOCUMENTS

WO    WO 03/051929    6/2003

(Continued)

OTHER PUBLICATIONS

Process Analysis & Automation Limited (PAA), "Acoustic Emission Technology—a New Sensing Technique for Optimising Polyolefin Production" (© 2000).

(Continued)

*Primary Examiner* — Fred M Teskin

(57) ABSTRACT

Provided is a method for monitoring a polymerization reaction in a fluid bed reactor to determine in on-line fashion a current value, and preferably also a limiting value, of a stickiness control temperature, and optionally controlling the reaction in response thereto in an effort to prevent occurrence of a discontinuity event. The stickiness control temperature is a temperature indicative of a characteristic of melting behavior of polymer resin in the reactor, and may be indicative of occurrence of resin sheeting or another discontinuity event. Optionally, a predetermined relation between values of acoustic energy in the reactor and values of a stickiness control temperature in used to provide error checking for determination of the stickiness control temperature, or a current value of the stickiness control temperature is determined from acoustic data and a predetermined relation between values of an acoustic condition in the reactor and values of the stickiness control temperature.

20 Claims, 7 Drawing Sheets

Fluidized Bed Reaction System

U.S. PATENT DOCUMENTS

2007/0060721 A1 3/2007 Muhle et al.
2008/0319583 A1* 12/2008 Hagerty et al. ............... 700/269
2010/0144983 A1 6/2010 Markel et al.

FOREIGN PATENT DOCUMENTS

| WO | WO 2005/113615 A2 | 12/2005 |
| WO | WO 2009/014682 | 1/2009 |

OTHER PUBLICATIONS

Process Analysis & Automation Limited (PAA), "Agglomeration Detection by Acoustic Emission," PAA Application note: 2002/111 (© 2000).

* cited by examiner

Fig. 3 - Fluidized Bed Reaction System

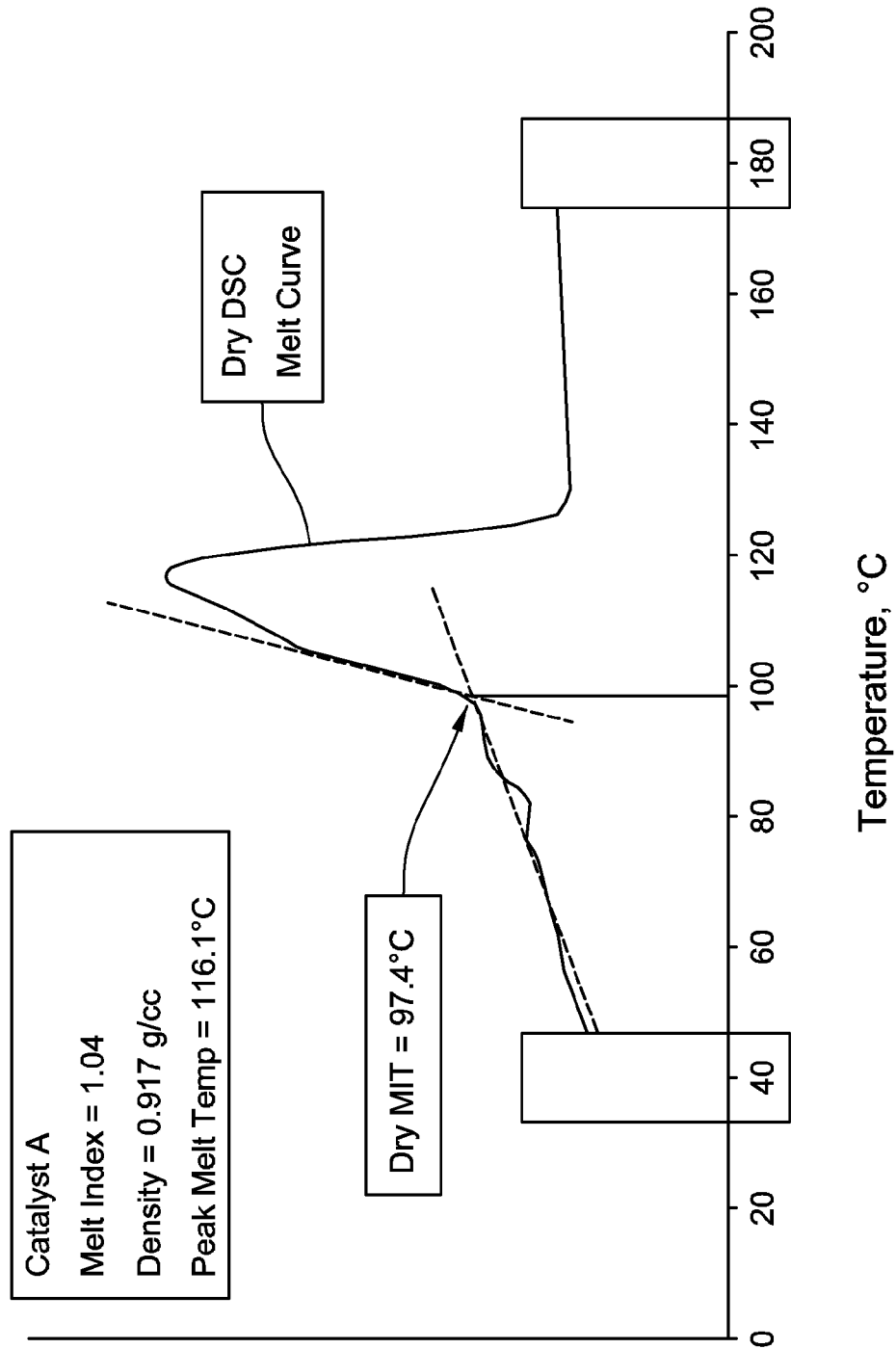

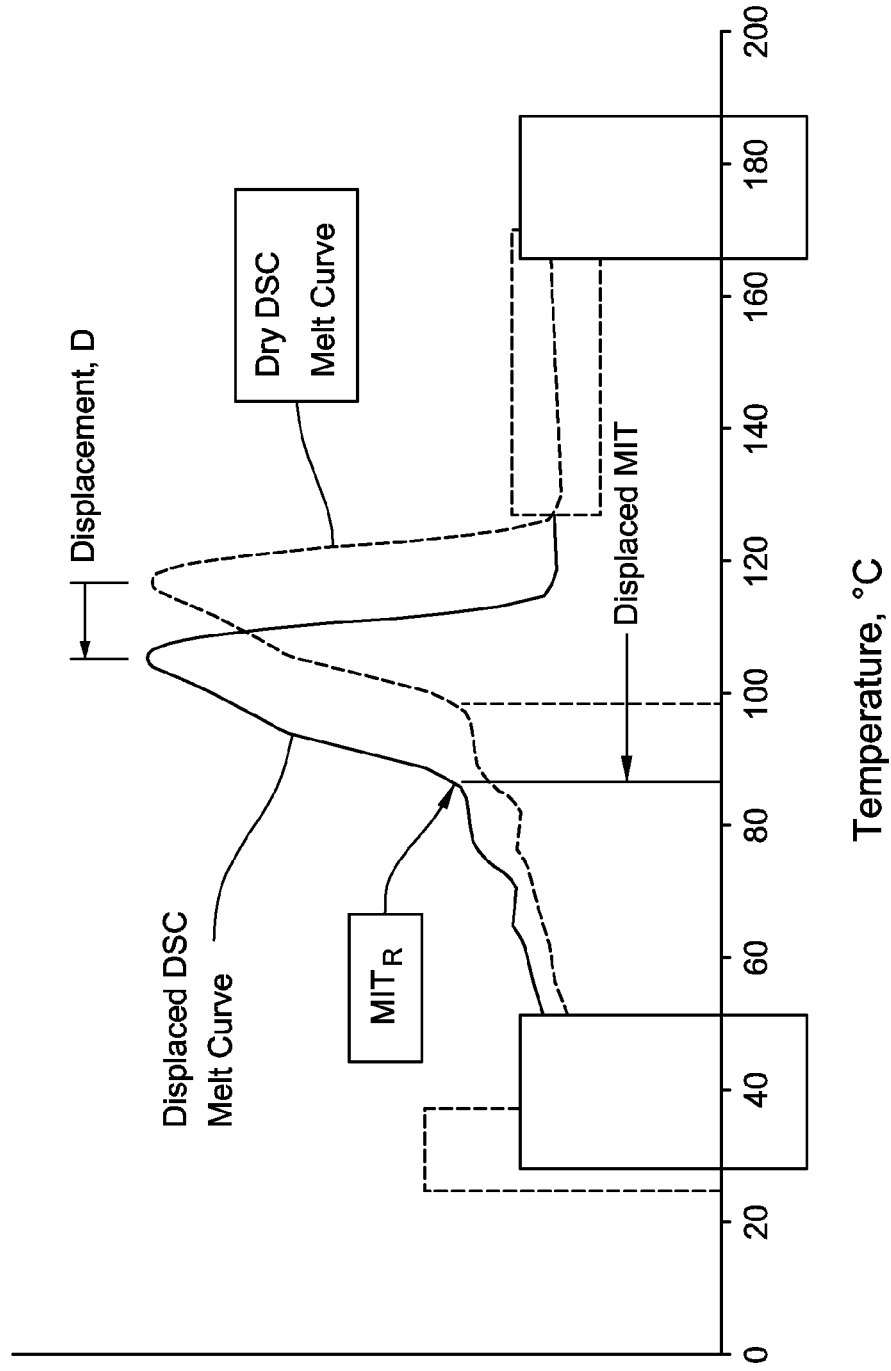
Fig. 6 - Displaced MIT (MIT$_R$)

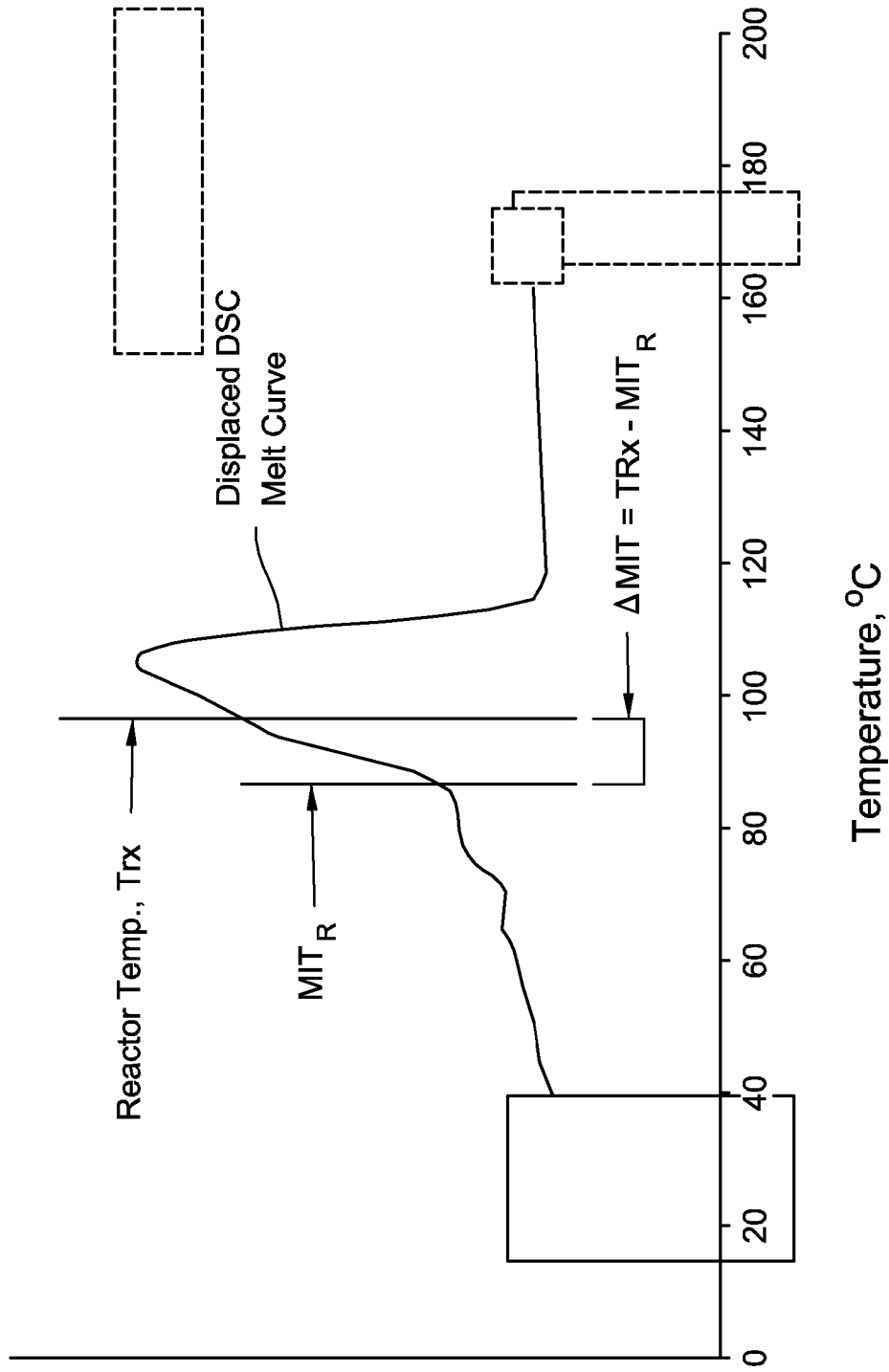
Fig. 7 - ΔMIT

METHOD FOR ON-LINE DETERMINATION OF DEGREE OR ONSET OF RESIN STICKINESS USING ACOUSTIC DATA

CROSS REFERENCE TO RELATED APPLICATIONS

This application claims the benefit of U.S. Provisional Application Ser. No. 61/176,661, filed on May 8, 2009, the disclosure of which is incorporated by reference in its entirety.

FIELD OF THE INVENTION

The invention pertains to methods for monitoring a polymerization reaction (e.g., an olefin polymerization reaction) which produces a polymer resin in a gas phase (e.g., fluid bed) reactor, generating (in on-line fashion) data indicative of a reference temperature indicative of a degree of stickiness of the resin in the reactor. Embodiments of the invention relate to monitoring a gas-phase polymerization reaction which produces a polymer resin in a fluid bed reactor to determine a reference temperature indicative of a degree of stickiness of the resin in the reactor, and optionally also controlling the reaction using the reference temperature or a temperature value related thereto.

BACKGROUND

The expression "on-line generation" of data during a reaction is used herein to denote generation of the data sufficiently rapidly that the data is available essentially instantaneously for use during the reaction. The expression "generation of data in on-line fashion" during a reaction is used synonymously with the expression on-line generation of data during a reaction. Generation of data from a laboratory test (on at least one substance employed or generated in the reaction) is not considered "on-line generation" of data during the reaction, if the laboratory test consumes so much time that parameters of the reaction may change significantly during the test. It is contemplated that on-line generation of data can include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the expression "diluent" (or "condensable diluent" or "condensable diluent gas") denotes condensable gas (or a mixture of condensable gases) present in a polymerization reactor with polymer resin being produced. The diluent is condensable at the temperatures encountered in the process heat exchanger. Examples of diluents include induced condensing agents (ICAs), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted comonomers and ICAs that had been dissolved in the polymer at the time of production. As will be discussed herein, a dry version of polymer resin has significantly different melting behavior than would the same polymer resin if it were in the presence of a significant amount of condensable diluent gas and comonomer.

The expression polyethylene denotes a polymer of ethylene and optionally one or more C3-C10 α-olefins while the expression polyolefin denotes a polymer of one or more C2-C10 α-olefins.

Throughout this disclosure, the abbreviation "MI" denotes melt index.

One commonly used method for producing polymers is gas phase polymerization. A conventional gas phase fluidized bed (fluid bed) reactor, during operation to produce polyolefins by polymerization, contains a fluidized dense-phase bed including a mixture of reaction gas, polymer (resin) particles, catalyst, and (optionally) catalyst modifiers. Typically, any of several process control variables can be controlled to cause the reaction product to have desired characteristics.

Generally in a gas-phase fluidized bed process for producing polymers from monomers, a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer is added to replace the polymerized monomer. The recycled gas stream is heated in the reactor by the heat of polymerization. This heat is removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to prevent excessive stickiness of polymer particles that if left unchecked, may result in loss of fluidization or agglomeration of the sticky particles which may lead to formation of chunks or sheets of polymer that cannot be removed as product. Further, such chunks or sheets may fall onto the distributor plate causing impaired fluidization, and in many cases forcing a reactor shutdown. Prevention of such stickiness has been accomplished by controlling the temperature of the fluid bed to a temperature below the fusion or sintering temperature of the polymer particles. Above this fusion or sintering temperature, empirical evidence suggests that such fusion or sintering leads to agglomeration or stickiness, which in turn can, if left unchecked, may lead to the above conditions.

It is understood that the amount of polymer produced in a fluidized bed polymerization process is directly related to the amount of heat that can be withdrawn from the fluidized bed reaction zone since the exothermic heat generated by the reaction is directly proportional to the rate of polymer production. In steady state operation of the reaction process, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficient to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point can be calculated knowing the gas composition and is thermodynamically defined using an equation of state.

Contrary to this belief, as suggested by Jenkins, et al. in U.S. Pat. No. 4,543,399 and related U.S. Pat. No. 4,588,790, a recycle stream can be cooled to a temperature below the dew point in a fluidized bed polymerization process resulting in condensing a portion of the recycle gas stream. The resulting stream containing entrained liquid is then returned to the reactor without causing the aforementioned agglomeration and/or plugging phenomena (which had been expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the amount of polymer production in a given reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in "condensed mode" operation remains entrained or suspended in the gas phase of the mixture. Vaporization of the liquid occurs only when heat is added or pressure is reduced. In the process described by Jenkins, et al., vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the lower gas temperatures of the gas stream entering the fluidized bed. Both of these factors increase the overall heat removal capability of the system and thereby enable higher space-time yields (higher reactor production rates per unit volume of the fluidized bed).

Jenkins, et al. illustrate the difficulty and complexity of such reactor control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option described is to add non-polymerizing, non-reactive materials to the reactor, which are condensable at the temperatures encountered in the process heat exchanger. Such non-reactive, condensable materials are collectively known as induced condensing agents (ICAs). Increasing concentrations of ICA in the reactor causes corresponding increases in the dew point temperature of the reactor gas, which promotes higher levels of condensing for higher (heat transfer limited) production rates from the reactor. Suitable ICA materials are selected based on their specific heat and boiling point properties. In particular, an ICA compound is selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

U.S. Pat. No. 5,352,749, to DeChellis et al, teaches, among other things, that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. U.S. Pat. Nos. 5,352,749, 5,405,922 and 5,436,304, suggest upper limits of ICA in the reactor, depending on the type of polymer being produced. The authors characterized the upper limit of condensable materials by tracking the ratio of fluidized bulk density to settled bulk density. As the concentration of isopentane (ICA) was increased in an otherwise steady-state reaction, they found that the bulk density ratio steadily decreased. When the concentration of isopentane was sufficiently high, corresponding to a bulk density ratio of 0.59, they found that fluidization in the reactor was lost. They, therefore, determined that this ratio (0.59) represented a limiting value below which a reactor would cease functioning due to loss of fluidization.

As described in PCT Application Publication Number WO 2005/113615(A2) and U.S. Pat. No. 7,122,607, attempts to operate polymerization reactors with excessive ICA concentrations cause polymer particles suspended in the fluid bed to become cohesive or "sticky" and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting in the straight sided reaction section, sheeting in the dome of such a reactor or chunking, any of which can lead to reactor shut-downs, which in large scale reactors are expensive. These solid masses (sheets or chunks) of polymer eventually become dislodged from the walls and fall into the reaction section and settle on the distributor plate, where they interfere with fluidization, block the product discharge port, and usually force a reactor shut-down for cleaning. The term "discontinuity event" is used to describe a disruption in the continuous operation of a polymerization reactor caused by sheeting, chunking or distributor plate fouling. The terms "sheeting and/or chunking" while used synonymously herein, may describe different manifestations of problems caused by excessive polymer stickiness in the fluid bed. In either manifestation (sheeting or chucking) the excessive polymer stickiness can lead directly to a reactor discontinuity event with the associated loss production.

WO 2005/113615(A2) and U.S. Pat. No. 7,122,607 disclose a "critical temperature" (sometimes denoted herein as "CT") of a resin-producing polymerization reaction in a gas phase fluid-bed reactor and use of this critical temperature to control the reactor. The CT is a property of the specific polymer (e.g., polyolefin) produced by the reaction and is a temperature in the fluid bed below which the polymer cannot become sticky regardless of the concentration of condensable diluent(s) in the reactor. Thus, if the reactor were operated with a temperature equal to or less than the CT to produce the polymer in the fluid bed, it would be impossible for the polymer to become sticky even under conditions of maximum depression of the polymer's dry sticking temperature (where the actual amount of depression of the dry sticking temperature would depend on the actual concentration of condensable diluent(s) in the reactor). CT varies with the characteristics of a polymer (e.g., density and MI) but not with temperature and other reaction conditions of the polymerization reaction which produces the polymer.

The "dry sticking temperature" of a polymer in a fluid bed reactor is defined in U.S. Pat. No. 7,122,607 as the temperature at which agglomeration or fouling on any surface of the reactor vessel begins to occur, or the temperature at which there is at least a 50% drop in bandwidth of the bed DP reading, whichever is less, with the reactor operating at normal pressure and gas velocity but in the presence of substantially pure nitrogen rather than the gas components actually present with the polymer during the reaction (where "bed Dreading" denotes measured pressure difference between the bottom and top of the fluid bed). "Melting point depression" is the temperature by which the dry sticking temperature of a polymer in a polymerization reactor (or a temperature assumed to be at least substantially equal thereto, e.g., the melting point of a dry version of the polymer) is reduced by the presence of condensable diluent (ICA and comonomer) used during the reaction.

The CT disclosed in U.S. Pat. No. 7,122,607 is the polymer's dry sticking temperature minus the largest melting point depression that could occur due to the presence of condensable diluent(s) in the reactor. The difference between dry and fully immersed (liquid) Differential Scanning Calorimeter ("DSC") peak melting temperatures for the polymer is taken to be the maximum melting point depression, with the DSC peak melting temperature of the dry polymer assumed to correspond to the polymer's dry sticking temperature. The CT disclosed in U.S. Pat. No. 7,122,607 is typically not the same temperature as the temperature dMIT=ΔMIT defined in the MIT application discussed below. The value of dMIT depends on the concentration of condensable diluent(s) in a polymerization reactor during production of a polymer, and thus can vary as a function of time during the reaction as diluent concentration changes. Depending on the current value of dMIT, the reaction may be subject to a high or low risk of occurrence of reactor sheeting or another discontinuity event. In contrast, the CT for a polymer is a limiting value that bounds the set of all the possible dMIT values that can exist during production of the polymer.

WO 2005/113615(A2) and U.S. Pat. No. 7,122,607 do not teach a method for on-line monitoring of a polymerization reaction including by monitoring the reaction to generate reaction parameter measurements and determining (in on-line fashion) the reaction's CT (or any other parameter indicative of onset or degree of stickiness) from these measurements. Rather, determination of the reaction's CT in accordance with the teaching of these references would require laboratory tests that could not be performed sufficiently rapidly during the reaction so that the CT would be available essentially instantaneously for use during the reaction.

Two articles by Process Analysis & Automation Limited (PAA), entitled "Agglomeration Detection by Acoustic Emission," PAA Application note: 2002/111 (© 2000) and "Acoustic Emission Technology—a New Sensing Technique for Optimising Polyolefin Production" (©2000), suggest process control in fluid bed production of polyolefins utilizing acoustic emission sensors located at various positions on the reactor and recycle piping. These publications purport to solve the problem of detecting large polymer agglomerates in a reactor, such as chunks or sheets, rather than detecting stickiness of the resin particles, and provide only one specific example, showing the detection of a chunk of approximately 1.5 meters in diameter within a commercial fluid bed reactor. There is no mention of the detection of polymer stickiness or cohesiveness. In effect, the PAA documents describe the detection of agglomerates after they have been formed in the reactor, rather than detection of resin stickiness that, if left unchecked, could lead to the formation of the agglomerates.

PCT Application Publication Number WO 03/051929 describes the use of mathematical chaos theory to detect the onset and presence of sheeting in a fluid bed reactor. Signals from a range of instruments, including acoustic emission sensors, differential pressure sensors, static sensors, and wall temperature sensors are filtered by certain specified methods to construct a "time-series" of data, which is then processed by methods of non-linear dynamics herein referred to as chaos theory and compared to data from a control reactor running without sheeting. The onset of sheeting is indicated by an increase in mean "cycle time" (relative to a baseline, control reactor), usually with a concurrent decrease in the "mean deviation" of the time-series. Alternatively, the onset of sheeting is indicated by a decrease in the mathematical "entropy" of the time-series data, as compared to a similar reactor running without sheeting. (The terms "time-series", "cycle time", "mean deviation", and "entropy" here refer to calculated parameters defined by chaos theory.) This reference does not disclose processing of sensor readings (without recourse to the complexities involved with chaos theory) to generate data indicative of conditions at which the resin in a reactor is predicted to become sticky, or any method allowing safe operation of a polymerization reactor near its limit of ultimate cooling capacity for maximum production rates.

Adding to the complexity of control of stickiness while using ICAs, different polymer products vary widely in their ability to tolerate ICA materials, some having a relatively high tolerance (expressed in partial pressure of the ICA in the reactor), e.g. 50 psia, while other polymers may tolerate as little as 5 psia. In these latter polymers, the heat transfer limited production rates under similar conditions are substantially lower. Polymers which possess a more uniform comonomer composition distribution are known to have a higher tolerance to the partial pressure of the ICA in the reactor. Metallocene catalyst produced polymers are a good example of polymers with such a more uniform comonomer composition. However, at some point even these metallocene produced polymers reach a limiting ICA concentration that induces stickiness. The limiting ICA concentration depends on several factors in addition to the polymer type, including reactor temperature, comonomer type and concentration. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Large-scale gas phase plants are expensive and highly productive. Risks associated with experimentation in such plants are high because downtime is costly. Therefore it is difficult to explore design and operating boundaries experimentally in view of the costs and risks.

It would be desirable to provide a method of determining a stable operating condition for gas phase fluid bed polymerization, especially for condensed mode operation, to facilitate optimum design of the plant and determination of desirable process conditions for optimum or maximum production rates in a given plant design.

It would also be desirable to have a mechanism in commercial gas-phase reactors to detect the onset of stickiness that is a better or earlier indicator of the onset of stickiness than are conventional techniques (e.g., monitoring the fluidized bulk density as described in U.S. Pat. No. 5,352,749). Such a mechanism would allow the operators to determine when conditions of limiting stickiness are being approached, and enable them to take corrective action before discontinuity events (such as sheeting and chunking) occur, while keeping the reactors at or near conditions of maximum ICA concentration, permitting higher production rates with substantially less risk.

U.S. Patent Application Publication No. 2007/0060721 A1, published on Mar. 15, 2007, and entitled "Method for Operating a Gas-Phase Reactor at or Near Maximum Production Rates While Controlling Polymer Stickiness," by Michael E. Muhle and Robert O. Hagerty, filed as application Ser. No. 11/227,710 on Sep. 14, 2005, discloses monitoring of resin stickiness (during operation of a polymerization reactor) by generating a time series of readings of acoustic emissions of the contents of the reactor using acoustic emission sensors. The method includes a preliminary step of generating acoustic emission measurements during steady state operation of the reactor to produce a polymer resin by polymerization. Additional acoustic emission measurements are then generated during operation of the reactor and the latter measurements are processed to determine whether the measured emissions deviate from acoustic emissions indicative of steady state reactor operation. Such deviation is treated as an indication of onset of excessive stickiness of polymer particles in the reactor, in response to which corrective action can be taken (e.g., ICA and/or monomer levels and/or reactor temperature can be adjusted). However, this reference does not teach determination of a reference temperature above which polymer resin in a reactor is predicted to become sticky.

More specifically, above-referenced U.S. Application Publication No. 2007/0060721 teaches detecting onset of excessive stickiness (of polymer within a fluid bed reactor) by monitoring a running average of readings from one or more acoustic emission sensors positioned adjacent to the fluid bed. The application teaches that the acoustic emission sensors can be located or mounted on the exterior of the reactor adjacent to (but outside) the fluid bed, and that in typical cases in which the reactor has a cylindrical portion above a distributor plate and below a conical top section, the acoustic emission sensors can be positioned along any part of the cylindrical portion from the top of the distributor plate to the junction of the cylindrical wall with the conical section (e.g., the sensors can be positioned more than 0.05, 0.1, 0.15, 0.2 or 0.25 reactor diameters above the distributor plate, and/or more than 0.05, 0.1, 0.15, 0.2 or 0.25 reactor diameters below the cylindrical-conical junction, where, although the distributor plate is on the inside of the reactor, the sensors can be positioned above the level of the distributor plate but on the exterior of the reactor). Any number (e.g., 1, 2, 3, 4, 5, 6, 7, 8, 9, or 10, or more) of acoustic emission sensors can be positioned along the cylindrical section of the reactor.

In the method described in U.S. Application Publication No. 2007/0060721, the running average of readings is calculated using a "moving time window" averaging method. The average is defined as the sum of n individual readings in a time window divided by n:

$$\overline{X} = \frac{\sum_{i=1}^{n} X_i}{n}$$

where $\overline{X}$ is the current value of the running average and $X_i$ is an individual reading. U.S. Publication No. 2007/0060721 teaches that the n individual sample points are preferably collected at equally spaced time intervals within the window, that suitable time windows for the time window averaging are 0.01 to 1000 seconds, or 0.1-750 seconds, or 1 to 500 seconds, and that a significant increase in resin stickiness is indicated by a "significant" decrease in the running average signal, defined as a decrease of one or more standard deviations of that signal. The standard deviation ("s") is computed by the formula:

$$s^2 = \frac{\sum_{i=1}^{n}(X_i - \overline{X})}{(n-1)}$$

where $X_i$ is an individual reading of an acoustic emission sensor within the window, n is the total number of observations, and $\overline{X}$ is the running average of the acoustic emission signal, described above. The number of sample points used in the calculation of standard deviation is equal to the number of sample points involved in the calculation of the running average. If, for example, the time window for computing the running average is 60 seconds, and the sampling frequency is 10 points per second, then n is equal to 600. The sample points $X_i$ used in the calculation of standard deviation may be the same as those used in the running average calculation.

U.S. Publication No. 2007/0060721 teaches that suitable sampling frequencies for the acoustic emission sensors for use in the running average and standard deviation calculations may be from 0.01 to 1000 samples per second, or 0.1-750 seconds, or from 1 to 500 samples per second, and that the total number of samples n involved in the calculations (equal to the product of the window width and the sampling frequency) should be from 10 to 100,000 or from 50 to 10,000, and that increasing stickiness of reactor contents is indicated by a decreasing level of acoustic emissions in the fluidized portion of the bed (i.e., by a "quieter" bed, in terms of its acoustic emissions signal).

U.S. Publication No. 2007/0060721 also teaches that individual grades of polymer produced in gas-phase reactors under condensed mode conditions are subject to different operating conditions and will tolerate different levels of ICA(s) and/or comonomer(s), and/or temperature and therefore will have different limiting stickiness thresholds or points (due to the effect of the different molecular weights and comonomer incorporation levels of the different grades), and thus that to determine an expanded operating window (to increase production rates) by use of acoustic emission sensor(s), the operators of the process, for each given grade, should first run the process at steady state in a safe condition with optimum production conditions, and record the acoustic emissions under each such set of steady state conditions. Then, to increase production rate, reactor conditions are changed (e.g., by increasing the catalyst feed rate and/or increasing ICA concentration level and/or increasing reactor temperature) and the acoustic emissions are again monitored. When the measured acoustic emissions drop by a predetermined number of standard deviations (e.g., by 0.1, or 1, or 2, or more standard deviations) below the corresponding steady state, "safe" mode level of acoustic emissions (e.g., when the reactor is determined to be "quieter" by a sufficient degree as determined by the processed acoustic emission sensor measurements), the operators can take corrective action.

As described in U.S. Publication No. 2007/0060721, each acoustic emission sensor is essentially a small microphone that can detect and amplify high frequency (ultrasonic) sound waves. The sensor typically utilizes a piezoelectric transducer to detect the acoustic signal generated by the impact of resin particles on the walls surrounding a flowing stream (the fluid bed section of a reactor). The acoustic signal is normally measured in the ultrasonic range. The sensors may be narrow bandwidth piezo-electric sensors with local pre-amplifiers producing an industry standard gain of 40 decibels (dB), where 0 dB equates to a 1 microvolt output from a sensor. The pre-amplifier output can be further amplified using a series of signal amplifiers with a range of 0 to 48 dB to produce measurable signals in the range of 1 to 10 volts. The latter signals can be narrow-band filtered around a center frequency of 190 kHz using a 100-350 kHz band pass filter, and then further conditioned (e.g., in a root mean square filter) to produce an output proportional to lower frequency variations (typically in the audible range of 0 to 20 kHz) in the envelope of the narrow-band filtered acoustic emission signal.

U.S. Patent Provisional Applications No. 60/842,747 ("MRT application") and 60/842,719 ("MIT application"), both filed on Sep. 7, 2006, describe methods for detecting conditions indicative of imminent occurrence of sheeting during polymerization reactions in fluid bed polymerization reactors, and preferably also controlling the reactions to prevent the occurrence of sheeting.

The MRT application describes a method including of the steps of: monitoring a polymerization reaction which produces a polymer resin in a fluid bed reactor; and in response to data indicative of at least one monitored parameter of the reaction (and a dry melt reference temperature that is characteristic of melting behavior of a dry version of the polymer resin), determining, in on-line fashion, a reduced melt reference temperature characteristic of the melting behavior of the polymer resin as it exists in the reactor. The reduced melt reference temperature ($MRT_R$) is at least substantially equal to the difference between the dry melt reference temperature and a melt reference temperature depression value, "D," where D is a temperature by which the dry melt reference temperature is depressed by the presence of diluent that is present with the resin in the reactor. The method optionally also includes the steps of determining a stickiness control parameter from the reduced melt reference temperature, and controlling the reaction in response to the stickiness control parameter. A melt reference temperature depression model is used to determine, in on-line fashion, from the data indicative of at least one monitored parameter of the reaction and the dry melt reference temperature value, a reduced melt reference temperature for the polymer resin in the presence of the at least one condensable diluent gas. The melt reference temperature depression model predicts the amount by which the dry melt reference temperature is reduced by the presence with the resin of the condensable diluent gas (e.g., ICA, comonomer, and isomer(s) of at least one comonomer) present with the resin in the reactor during the reaction.

The MIT application describes a specific implementation of the MRT method, including the steps of:
 (a) during a polymerization reaction in a fluid bed reactor which produces a polymer resin, measuring parameters of the reaction including at least reactor temperature, at least one resin property of the polymer resin, and concentration of at least one condensable diluent gas in the reactor;
 (b) determining from the at least one resin property, using a predetermined correlation, a dry melt initiation temperature of a dry version of the polymer resin; and
 (c) during the reaction, using a melt initiation temperature depression model to determine, in on-line fashion from at least some of the parameters measured in step (a) and the dry melt initiation temperature value, a reduced melt initiation temperature for the polymer resin in the presence of the at least one condensable diluent gas, said melt initiation temperature depression model identifying an estimated degree of depression of the dry melt initiation temperature due to presence of at least one diluent with the polymer resin. In typical embodiments, the melt initiation temperature depression model implements the well-known Flory melt depression equation; and the method optionally also includes the step of:
 (d) determining in on-line fashion a temperature value indicative of resin stickiness in the reactor, from the reduced melt initiation temperature determined in step (c) and a current value of the reactor temperature. Typically, the temperature value generated in step (d) is a temperature value dMIT that is at least substantially equal to $Trx-MIT_R$, where Trx is the current value of reactor temperature, and $MIT_R$ is the reduced melt initiation temperature determined in step (c). The temperature value indicative of resin stickiness determined in this manner (dMIT) may be used as a parameter to control resin stickiness in the fluid bed.

The expression "melt reference temperature depression model" is used herein in the same broad sense in which it is used in the MRT application, and the expression "melt initiation temperature depression model" is used herein in the same sense in which it is used in the MIT application. Each melt initiation temperature depression model is a member of the broader class of "melt reference temperature depression models," so that the set of all melt initiation temperature depression models is a subset of the set of all melt reference temperature depression models.

Until the present invention, it was not known how to perform on-line determination or detection of the onset or degree of resin stickiness in a reactor from acoustic data, generated in on-line fashion during a polymerization reaction and indicative of acoustic conditions in the reactor, without performing a statistical analysis of the acoustic data (e.g., as described above-discussed US Application Publication No. 2007/0060721). Nor had it been known how to monitor a polymer resin-producing polymerization reaction in a fluid bed reactor to generate (in on-line fashion) acoustic data indicative of an acoustic condition in the reactor, and to control the reaction (in on-line fashion) in response to the acoustic data in an effort to prevent occurrence of a discontinuity event.

Use of acoustic emission ("AE") data to monitor resin stickiness (as described in US Publication No. 2007/0060721) can reliably predict trends (e.g., of increasing or decreasing degree of stickiness) in the AE data. However, this type of method is seriously limited in its ability to give a precise, quantitative prediction of a stickiness limit (a limiting value of a stickiness control parameter determined from the acoustic emission data) because it is difficult to establish a reliable baseline or reference value of a stickiness control parameter from acoustic emission data. Because of this limitation, it is difficult to establish from the acoustic emission data a reliable, quantitative value for a stickiness limit.

US Publication No. 2007/0060721 suggests that the required reference values of a stickiness control parameter are acoustic emission readings when the bed is fluidized at non-sticking conditions, ideally with only nitrogen or other non-soluble gas in the system. In practice, a range of reference values would be required, corresponding to the range of temperatures and resin products to be present in the reactor. Obtaining this data in a commercial reactor system would be time-consuming and expensive. Further complicating matters is the possibility that these reference values (once obtained) could change with time due to instrument drift or changes in the acoustic coupling of the instruments to the reactor wall. The net result is that an acoustic emission system is not sufficiently reliable for quantitative predictions of stickiness limits.

The inventors have recognized that due to the potential for error in measurements of reaction parameters during polymerization reaction monitoring of the types described in the MRT and MIT applications, and the difficulties in establishing the required reference values for polymerization reaction monitoring using acoustic emission data, a need exists for a more reliable method of determining stickiness limits in a gas phase polymerization reactor.

More specifically, the inventors have recognized that the accuracy of dMIT values generated as described in the MIT application depend on the accuracy of monitored process data used to generate the dMIT values, and that each type of process data typically used to generate dMIT values (e.g., fluid bed temperature, gas composition, and resin density and melt index) is subject to error. Measured values of resin properties (e.g., density and melt index) are subject to error due to the relatively complicated procedures typically required for their measurement. Measurement of resin density is particularly prone to error.

Measurement of the composition of gas present with the polymer resin (typically carried out with process gas chromatographs or "GCs") is usually quite accurate in normal operations, but has a relatively high sensitivity to error. Of particular concern is error caused problems in the small sampling lines that are used to take gas from the reactor to the measuring instrument (e.g., a process GC). These lines are known to be prone to blockage by polymer fines and to gas condensation, either of which can lead to substantial errors in measurement. Measurement errors can also be induced by problems with process GCs, such as unexpected shifts in calibration of the instrument, as well as typical reliability issues associated with any complex instrument.

Of all the measured data typically used to generate dMIT values, the measurement of temperature (e.g., bed or skin temperature) is probably the most accurate and reliable. However, even this type of measurement can be subject to error if the sensing element is covered by a coating of resin in the reactor, or if the instrument becomes mechanically damaged.

SUMMARY

In a class of embodiments, the invention provides improved on-line monitoring of the degree or onset of resin stickiness in a gas phase, fluid bed polymerization reactor. These embodiments generate acoustic emission ("AE") data indicative of at least one value of an acoustic condition in the reactor and use the AE data to determine a stickiness control temperature. The stickiness control temperature is a temperature indicative of a characteristic of melting behavior of polymer resin in the reactor (e.g., a current value of dMRT, dMIT, reduced melt initiation temperature, or reduced melt reference temperature as defined herein). Determining the stickiness control temperature in accordance with the invention using AE data (preferably using aspects of the teaching of the MRT application or MIT application) can provide the same quantitative accuracy as the monitoring methods described in the MRT and MIT applications (the "dMIT" and "dMRT" methods) while avoiding reliability issues associated with potentially erroneous data flowing into the dMIT or dMRT method calculations. In typical embodiments of the inventive method, at least one acoustic sensor generates and uses AE data to back-up (e.g., provide error checking for) a stickiness control temperature determined in accordance with the dMIT or dMRT method and warn of risk of erroneous data flow into the dMIT or dMRT method calculations.

The inventors have found that there is normally a one-to-one relationship between a dMIT value (determined under a set of reaction conditions using the dMIT method) and an acoustic energy value (indicated by measured AE data) indicative of acoustic energy amplitude in the reactor under the same reaction conditions. Both indicators of stickiness normally track together but in opposite directions in the sense that as the degree of stickiness increases, the acoustic energy value decreases and the dMIT value increases. Use of erroneous data in the dMIT method calculations is thus indicated whenever the two indicators deviate from their normal relationship and a warning can be provided to operators in response to such a deviation. Such a warning would minimize the risks associated with potentially incorrect dMIT calculations. In particular, it would minimize the risks associated with incorrectly calculated dMIT values that are too low, which could fail to indicate when conditions of excessive stickiness were being approached in the reactor.

Some embodiments of the invention generate AE data indicative of values of an acoustic condition in the reactor at least two different locations in the reactor. Typically, the data are generated using AE sensors at different elevations along the fluid bed. The AE data are used to determine stickiness control temperatures, each of which is a temperature (e.g., current value of dMRT, dMIT, reduced melt initiation temperature, or reduced melt reference temperature as defined herein) indicative of a characteristic of melting behavior of polymer resin at one of the locations in the reactor, or to determine a stickiness control temperature indicative of a characteristic of melting behavior of polymer resin in the reactor but not at a specific location in the reactor. Preferably, at least one AE sensor is located adjacent to each position known to be a potential point of sheet formation in the reactor. Such positions typically include the lower and upper sections of the fluid bed and the reactor expanded section. Stickiness control temperature(s) determined from the AE data, and preferably also stickiness control temperature(s) otherwise determined, provide an indication as to the approach to conditions of limiting stickiness at the location of at least one (or a subset) of the AE sensors, and as to associated potential for sheet formation at each such location.

In a class of embodiments, the inventive method employs at least one acoustic emission (AE) sensor and a predetermined relation between values of acoustic energy in the reactor (e.g., at one or more locations in the reactor's fluid bed) and values of a stickiness control temperature (e.g., at the same location(s) in the bed) to provide error checking for determination of the stickiness control temperature. The stickiness control temperature is a temperature indicative of a characteristic of melting behavior of polymer resin in the reactor (preferably, a characteristic of melting behavior of polymer resin in the reactor in the presence of at least one diluent). In these embodiments the method includes the steps of:

(a) in on-line fashion, determining a current value of the stickiness control temperature (e.g., a current value of dMRT, dMIT, reduced melt initiation temperature, or reduced melt reference temperature, as defined herein);

(b) in on-line fashion, generating acoustic emission ("AE") data indicative of an acoustic energy value using each AE sensor; and (c) determining from the predetermined relation an expected value of the stickiness control temperature corresponding to the acoustic energy value, and determining whether the current value of the stickiness control temperature determined in step (a) is consistent with the expected value of the stickiness control temperature.

Preferably, step (c) includes the step of asserting a warning (e.g., displaying a warning or producing an audible warning) in response to determining that the current value of the stickiness control temperature determined in step (a) is inconsistent with (e.g., differs by more than a predetermined amount from) the expected value of the stickiness control temperature. Preferably, step (a) includes the steps of performing a dMIT or dMRT method calculation to generate the current value of the stickiness control temperature in response to monitoring data indicative of at least one parameter of the reaction (typically including concentration of at least one condensable diluent gas in the reactor) and the warning is an indication to reactor operators of unacceptable level of risk of error in the monitoring data. In some cases, the warning is communicated by a process control computer normally used to monitor and control reactor operations. In response to the warning, plant operators may begin troubleshooting the monitored reaction parameter data used in dMIT or dMRT calculations, which may be or include temperature data, gas composition data, and/or resin property data.

Preferably step (a) also includes the step of generating a limiting value of the stickiness control temperature.

If a single AE sensor is used, its preferred location is typically on the reactor wall near the position of a temperature sensor used to monitor the bed temperature (to provide bed temperature data for calculating stickiness control temperatures, e.g., to determine the predetermined relation between values of acoustic energy in the reactor and stickiness control temperature values). Such an AE sensor position provides the best correlation between the AE readings and the stickiness control temperature values (e.g., dMIT values) calculated in response to the bed temperature measurements. In some embodiments, the bed control temperature sensor is located at an elevation of about one-half of the bed height and the AE sensor is located at or within two feet of this elevation.

If more than one AE sensor is used, the preferred location of at least one of them is on the reactor wall near the position of a temperature sensor used to monitor the bed temperature. The other AE sensors may be positioned at the same elevation or at different elevations.

Some embodiments of the inventive method employ AE sensors positioned at multiple locations in a reactor system (e.g., multiple elevations along a fluid bed) to detect localized excursions in current values of dMIT (or another stickiness control temperature) for a polymerization reaction. It is well known that conditions within a gas phase reactor are not uniform. In particular, temperature and comonomer concentration can vary with position (e.g., elevation) in the fluidized bed. These non-uniformities are especially pronounced when the reactor is run at high specific rates (i.e., with a high production rate per unit of reactor volume, or high "space-time yield", STY). Such high rate conditions can induce pronounced variations in temperature (e.g., 1-5 degrees C.) and gas phase concentrations (e.g., 5-10%) between the upper and lower sections of a fluid bed. These changes are enough to cause variations of dMIT of 3-8 degrees C. between the bottom and top of the fluid bed. With such large variations in dMIT between different regions in a fluid bed, it is possible that one (worst case) section of the bed will reach limiting stickiness before a limiting stickiness condition is reached in the bed as a whole.

Employing multiple AE probes at different locations (e.g., different elevations along a fluid bed) provides the ability to detect localized conditions of high stickiness (or risk or imminence thereof) that may exist at any of those locations. This is important because conditions of high stickiness may exist only locally, and be undetectable by a single, "global" stickiness monitor (where "global" stickiness monitor denotes one based on a single-location measurement of global diluent gas concentration). The ability to detect localized values of resin stickiness in accordance with preferred embodiments of the present invention enables reactor operators to take corrective action before a stickiness limit (e.g., a limiting dMIT value) is exceeded at any of multiple locations in a reactor, e.g., to prevent formation of sheets or occurrence of another discontinuity event.

In another class of embodiments, the invention is a method for monitoring a polymer resin-producing polymerization reaction in a fluid bed reactor to determine, in on-line fashion, a current value of a stickiness control temperature (e.g., a current value of dMRT or dMIT as defined herein, or of reduced melt initiation temperature or reduced melt reference temperature as defined herein) and preferably also a current limiting value of the stickiness control temperature (e.g., a current value of a critical temperature, "CT", in the reactor). The stickiness control temperature is a temperature indicative of a characteristic of melting behavior of polymer resin in the reactor (e.g., in the reactor's fluid bed), and is preferably indicative of a characteristic of melting behavior of polymer resin in the reactor in the presence of at least one diluent. For example, the stickiness control temperature may be a resin sticking temperature or a temperature indicative of imminence of resin stickiness in the reactor, or of approach of resin in the fluid bed to a sticky condition, or of degree of resin stickiness in the reactor, or of imminent occurrence or likelihood of occurrence of resin sheeting or another discontinuity event. Preferably also the method includes a step of controlling the reaction in response to at least one of the stickiness control temperature and the limiting value of the stickiness control temperature in an effort to prevent the occurrence of sheeting or another discontinuity event. In preferred embodiments in this class, the method uses a predetermined relation between values of an acoustic condition in the reactor (e.g., in the reactor's fluid bed) and values of a stickiness control temperature (of the type defined above in this paragraph), and includes the steps of:

(a) in on-line fashion, generating acoustic data indicative of at least one value of the acoustic condition in the reactor; and (b) in on-line fashion, determining the current value of the stickiness control temperature in the reactor from the acoustic data and the predetermined relation.

Step (b) is performed without performing a statistical analysis of the acoustic data generated in step (a). In preferred embodiments, the stickiness control temperature is a reduced melt reference temperature, $MRT_R$, as defined above, or $dMRT=\Delta MRT=Trx-MRT_R$, where Trx denotes current reactor temperature. In some other embodiments, the stickiness control temperature is a reduced melt initiation temperature, $MIT_R$, as defined above, or $dMIT=\Delta MIT=Trx-MIT_R$, as also defined above.

In a class of preferred embodiments, the predetermined relation (between values of the acoustic condition and values of the stickiness control temperature) recited in step (b) is determined before performance of step (b) by a method including the steps of:

(c) determining reference stickiness control temperatures for a set of polymerization reactions in the reactor, where each of the reference stickiness control temperatures is determined from a different measured reaction parameter set indicative of one of the reactions;

(d) identifying values of a reference acoustic condition in the reactor from measured acoustic data indicative of the polymerization reactions, where the reference acoustic condition has one (e.g., a different one) of said values in the reactor during each one of the reactions, and each of the values of the reference acoustic condition corresponds to the reference stickiness control temperature in the reactor for said one of the reactions; and (e) determining the predetermined relation (between the values of the acoustic condition and the values of the stickiness control temperature) from the reference stickiness control temperatures and the values of the reference acoustic condition.

In some embodiments, step (e) includes the steps of determining a plot of data values by plotting the reference stickiness control temperatures relative to the values of the reference acoustic condition, and fitting a curve to the plot (or processing the data values to accomplish the mathematical equivalent of these steps). The curve determines the predetermined relation.

The set of polymerization reactions recited in step (c) can consist of reactions that all produce the same (or substantially the same) polymer product but under different sets of conditions, so that each of the sets of conditions is indicated by one "measured reaction parameter set" recited in step (c). Alternatively, the polymerization reactions recited in step (c) include reactions that produce different polymer products (e.g., polymer products having similar composition but different density and/or MI) under different sets of conditions, and each of the sets of conditions is indicated by one "measured reaction parameter set" recited in step (c). Preferably, step (c) includes the step of determining each of the reference stickiness control temperatures from a melt initiation temperature depression model that identifies an estimated degree of depression of a dry melt initiation temperature (for a polymer product produced by the relevant polymerization reaction) due to presence in the reactor (with the polymer product) of at least one diluent. In other preferred embodiments, step (c) includes the step of determining each of the reference stickiness control temperatures from a melt reference temperature depression model that identifies an estimated degree of depression of a dry melt reference temperature (for a polymer product produced by the relevant polymerization reaction) due to presence in the reactor (with the polymer product) of at least one diluent. In either case, step (c) preferably includes the step of determining the reference stickiness control temperatures for a set of polymerization reactions characterized by a broad range of product densities and melt indices, and preferably also a broad range of production rates.

In some embodiments, step (c) determines a reference stickiness control temperature for each of the reactions (each such reference stickiness control temperature is one of the reference stickiness control temperatures recited in step (c)) by a method including the steps of:

(i) generating one said measured reaction parameter set for each of the reactions, including by monitoring parameters of the reaction, including at least reactor temperature, at least one resin property (e.g., resin density) of a polymer product of the reaction, and concentration of at least one condensable diluent gas in the reactor;

(ii) determining a dry melt initiation temperature of a dry version of the polymer product from the at least one resin property, using a predetermined correlation between resin melting temperature and said at least one resin property; and (iii) using a melt initiation temperature depression model to determine the reference stickiness control temperature from at least some of the parameters monitored in step (i) and the dry melt initiation temperature, said melt initiation temperature depression model identifying an estimated degree of depression of the dry melt initiation temperature due to presence of at least one diluent with the polymer product. The reference stickiness control temperature can be a reduced melt initiation temperature for the polymer product in the presence of the at least one condensable diluent gas, or it can be a stickiness monitoring and control parameter determined by such a reduced melt initiation temperature and a current value of the reactor temperature during the relevant one of the reactions. In typical embodiments, the melt initiation temperature depression model implements the well-known Flory melt depression equation (alternatively, other well-known methods such as Sanchez-Lacombe, SAFT or even empirical methods may be used to implement the model). In some embodiments, the stickiness monitoring and control parameter is a value $dMIT=dMIT$ that is at least substantially equal to $Trx-MIT_R$, where Trx is the current value of reactor temperature, and $MIT_R$ is a reduced melt initiation temperature determined (using the melt initiation temperature depression model) from at least some of the parameters monitored in step (i) and the dry melt initiation temperature in step (ii). Preferably, the melt initiation temperature depression model identifies an estimated degree of depression of the dry melt initiation temperature due to presence of at least one condensable diluent gas, and takes into account at least one of partial pressure of ICA, comonomer, and at least one isomer of the comonomer in the reactor. For example, in some cases in which the resin is polyethylene, the ICA is iC5 and the comonomer (or isomer thereof) is a C6 isomer. C6 isomers can accumulate to high levels on commercial reactors equipped with effective recovery systems, leading to a substantial impact on reduced melt initiation temperature.

Steps (ii) and (iii) can be performed in any of a variety of ways, including by accessing one or more look-up tables prepared in accordance with the predetermined correlation or the model.

In some implementations of step (c), at least one measured reaction parameter set includes a skin temperature measured using a skin temperature sensor (at a first location, at or near the reactor wall, during one of the polymerization reactions) and a bed temperature measured during the reaction using a bed temperature sensor (at a second location farther from the reactor wall than the first location). In such embodiments, step (a) preferably includes a step of using at least one acoustic probe positioned (e.g., near to the bed temperature sensor) so that the generated acoustic data are indicative of a value of an acoustic condition at the second location. For example, where the reactor vessel has a vertically oriented cylindrical portion above a distributor plate, the bed temperature sensor may be a bed control thermocouple positioned at an elevation of about 21 feet above the distributor plate.

In some embodiments, the inventive method includes a step of controlling the reaction in response to the stickiness control temperature value determined in step (b), typically in an effort to prevent (and preferably to prevent) the occurrence of sheeting or another discontinuity event. For example, in response to a stickiness control temperature indicating excessive resin softening, the reaction can be controlled in an effort to prevent dome sheeting. (In this case a response could include reducing the superficial velocity of fluidizing gas.) For another example, in response to a stickiness control temperature indicating an approach to conditions of excessive stickiness in the fluid bed, the reaction can be controlled to maintain the reactor in a stable, non-sticking condition.

In a class of preferred embodiments, relevant measured data from all reaction monitoring instruments and relevant calculated parameters are combined into an integrated computer display for presentation to users (e.g., plant operators). Such a computer display can be supplemented by process alarms or advisory notices to warn the users of conditions in the process that may be approaching those that will lead to sheeting (e.g., wall or dome sheeting) or other discontinuity events. The alarms or advisory notices can also be combined with recommended control actions to avoid a discontinuity event. For example, in response to the approach of the stickiness control temperature (determined so as to be the above-defined parameter dMIT) to a critical range (e.g., 6 to 8° C.), an advisory could be generated with a recommendation to reduce the reactor temperature and/or isopentane concentration to avoid excessive resin stickiness and the resulting dome sheeting.

Preferably, steps (a) and (b) are performed repeatedly (e.g., on an ongoing basis) during the reaction to determine a sequence of current values of the stickiness control temperature. Each stickiness control temperature value can be taken as an indication or estimate of the temperature at which significant melting of the polymer in the fluid bed would begin to occur under current reaction conditions.

Other embodiments of the inventive method pertain to a first subset and a second subset of a set of polymerization reactions, with each polymerization reaction in the first subset producing a polymer product in a first product class and each polymerization reaction in the second subset producing a polymer product in a second product class. For example, the first product class may consist of grades of very low density polyethylene (VLDPE) and the second product class may consist of grades of polyethylene other than VLDPE. These embodiments employ a first predetermined relation (between values of an acoustic condition measured during polymerization reactions in the first subset and stickiness control temperature values for such reactions) for reactions in the first subset and a second predetermined relation (between values of the acoustic condition measured during reactions in the second subset and stickiness control temperature values for such reactions) for reactions in the second subset. Some such embodiments include the steps of:

determining reference stickiness control temperatures for polymerization reactions in the first subset and additional reference stickiness control temperatures for polymerization reactions in the second subset, including by determining each of the reference stickiness control temperatures from a different measured reaction parameter set indicative of one of the polymerization reactions in the first subset and each of the additional reference stickiness control temperatures from a different measured reaction parameter set indicative of one of the polymerization reactions in the second subset;

identifying values of a reference acoustic condition in the reactor from measured acoustic data indicative of the reactions in the first subset and measured acoustic data indicative of the reactions in the second subset, where the reference acoustic condition in the reactor has one of said values during each one (e.g., a different one of said values in each different one) of the reactions and each of said values corresponds to a reference stickiness control temperature for said one of the reactions (in some embodiments, the measured acoustic data for each one of the reactions is included in the measured reaction parameter set indicative of said one of the reactions); and determining the first predetermined relation (between the values of the acoustic condition measured during the reactions in the first subset and stickiness control temperature values for such reactions) for the reactions in the first subset from the reference stickiness control temperatures and at least some of the values of the reference acoustic condition, and determining the second predetermined relation (between the values of the acoustic condition measured during the reactions in the second subset and stickiness control temperature values for such reactions) for the reactions in the second subset from the additional reference stickiness control temperatures and at least some of the values of the reference acoustic condition.

In another class of embodiments, the inventive method is for monitoring a polymer resin-producing polymerization reaction in a fluid bed reactor, and includes the steps of: (a) in on-line fashion, generating acoustic data indicative of at least one value of an acoustic condition in the reactor; and (b) in on-line fashion, controlling the reaction in response to the acoustic data in an effort to prevent occurrence of a discontinuity event. In some embodiments in this class, step (b) includes the steps of: in on-line fashion, determining a current value of a stickiness control temperature from the acoustic data and a predetermined relation between values of the acoustic condition in the reactor and values of the critical temperature, where the stickiness control temperature is a temperature indicative of a characteristic of melting behavior of polymer resin in the reactor; and controlling the reaction in response to the current value of the stickiness control temperature. In some embodiments, the stickiness control temperature is indicative of a characteristic of melting behavior of polymer resin in the reactor in the presence of at least one diluent.

Another aspect of the invention is determination (for reactions producing VLDPE) of a calculated stickiness control temperature (sometimes referred to herein as a Softening Initiation Point or "SIT") using a melt reference temperature depression model (e.g., a melt initiation temperature depression model) that accounts for the slow crystallization kinetics of VLDPE resin. In some embodiments, the inventive method relies upon a predetermined relation between values of an acoustic condition in a polymerization reactor and values of a stickiness control temperature, SIT, in the reactor, and the method includes the steps of:

in on-line fashion, generating acoustic data indicative of at least one value of the acoustic condition in the reactor; and in on-line fashion, determining a current value of the stickiness control temperature, SIT, from the acoustic data and the predetermined relation.

BRIEF DESCRIPTION OF THE DRAWINGS

FIG. 5 is a first melt DSC curve generated from measured data for the polymer and catalyst listed in Row 6 of Table 1. A dry MIT value of 97.4° C. was determined from the initial inflection point of the DSC curve as shown in the figure.

FIG. 6 is the DSC curve of FIG. 5 and another first melt DSC curve that shows the effect of dissolved hydrocarbons in displacing (or "depressing") the DSC curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory equation.

FIG. 7 is a first melt DSC curve with indications that illustrate a calculation of the control variable dMIT as the difference between the reactor temperature (Trx) and the shifted value of the melt initiation temperature $MIT_R$.

DETAILED DESCRIPTION

Figure 1:
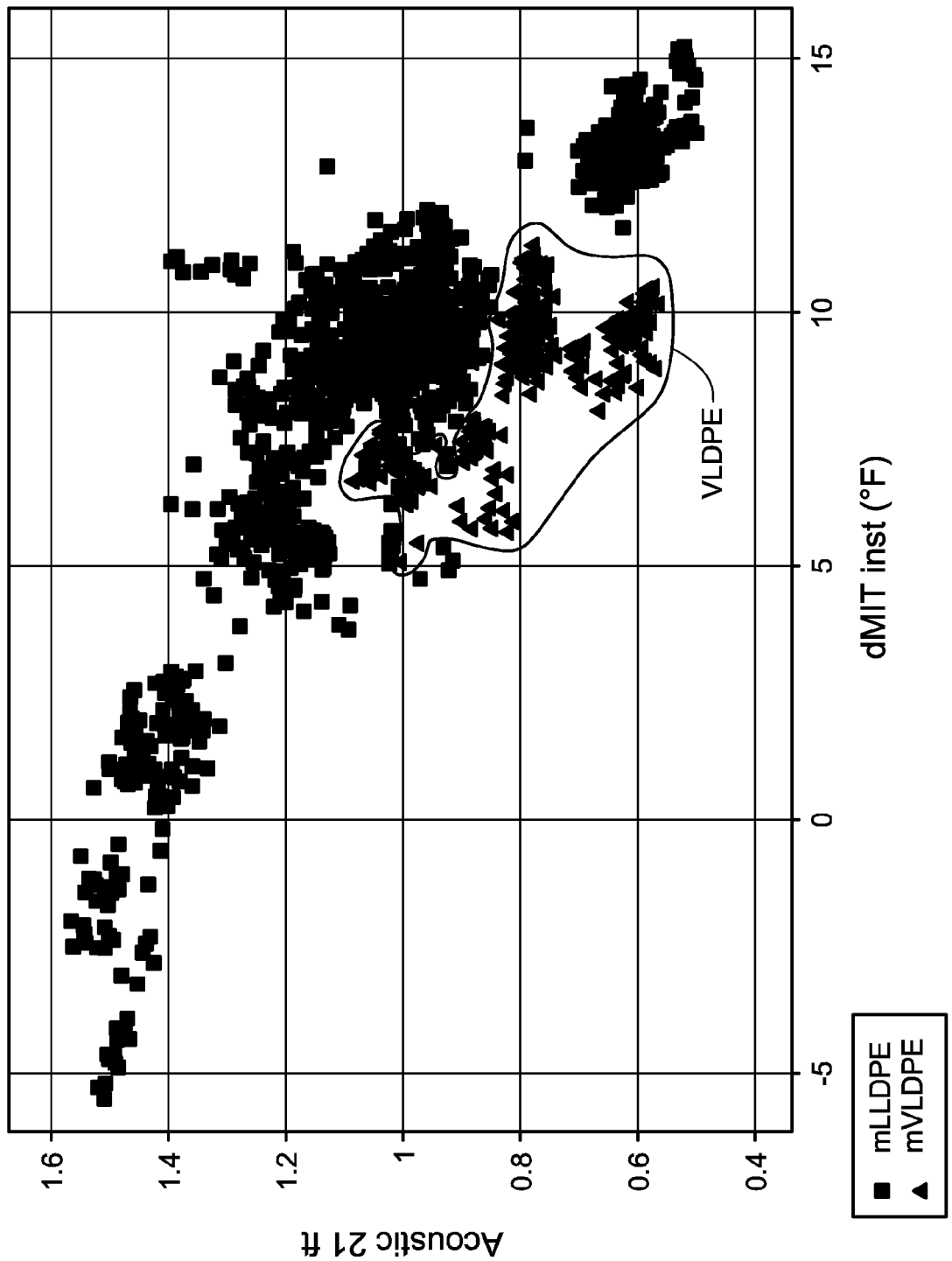
FIG. 1 is a plot of data values, each indicative of one of a set of stickiness control temperatures (each from a set of monitored reaction parameters) and a "value of an acoustic parameter in the fluid bed" for each stickiness control temperature.

Before the present compounds, components, compositions, devices, softwares, hardwares, equipments, configurations, schematics, formulas, systems, and/or methods are disclosed and described, it is to be understood that unless otherwise indicated this invention is not limited to specific compounds, components, compositions, devices, softwares, hardwares, equipments, configurations, schematics, formulas, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

For the sake of brevity, where applicable, certain terminology defined in the BACKGROUND will not be repeated here but is incorporated by reference in this Section.

A reactor system whose operation can be monitored and optionally also controlled in accordance with the invention will be described with reference to FIG. 3. The FIG. 3 system includes fluidized bed (fluid bed) reactor 110. Reactor 110 has a bottom end 11, a top expanded section 19, a cylindrical (straight) section 14 oriented vertically between bottom end 11 and top section 19, and a distributor plate 12 at the lower end of section 14. A fluidized bed 15 of granular polymer and catalyst particles is contained within straight section 14. The bed is fluidized by a steady flow of recycle gas through the distributor plate 12. The flow rate of fluidizing gas is regulated to provide the fluidized bed with relatively good mixing, as illustrated in the figure.

The reactor system also includes catalyst feeder 109 for controlled addition of polymerization catalyst to the fluidized bed reaction zone. Within the reaction zone (i.e., the fluidized bed), the catalyst particles react with the ethylene and comonomer and optionally other reaction gas to produce granular polymer particles. As new polymer particles are produced, other polymer particles are continually withdrawn from the fluidized bed through a product discharge system (not shown). After passing through the product discharge system, the polymer granules are degassed (or "purged") with a flow of inert nitrogen to remove substantially all of the dissolved hydrocarbon materials. Optionally, moisture is added during the purging process. The degassed resin is generally pelleted using an extruder. To simplify FIG. 3, neither a purger nor an extruder is shown.

Figure 3:
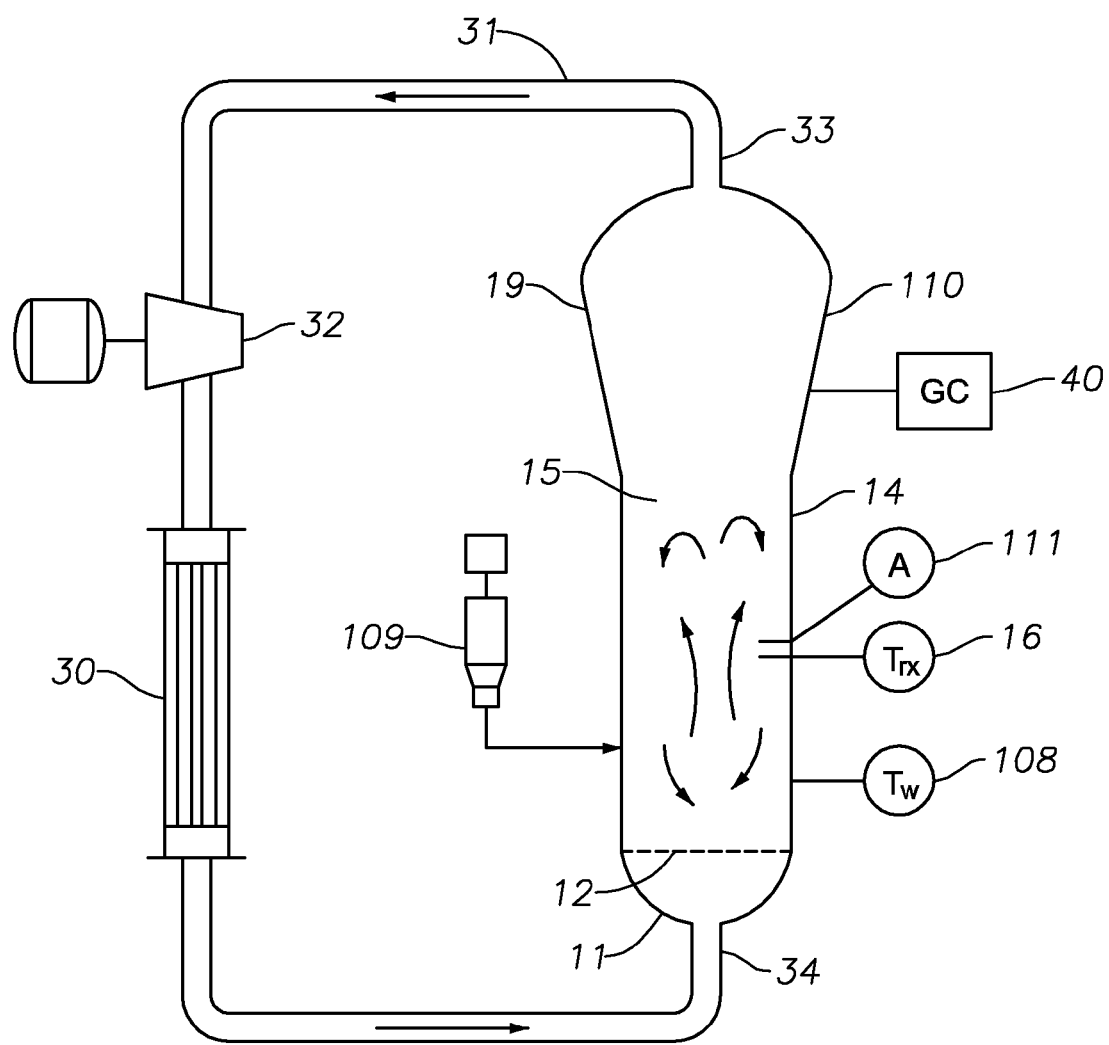
FIG. 3 is a simplified cross-sectional view of a reaction system including a fluid bed reactor (110), whose operation can be monitored and optionally also controlled in accordance with the invention.

The reactor system of FIG. 3 also has a cooling control loop which includes recycle gas line 31, circulating gas cooler 30, and compressor 32, coupled with reactor 110 as shown. During operation, cooled circulating gas from cooler 30 flows through inlet 34 into reactor 110, then propagates upward through the bed and out from reactor 110 via outlet 33.

Expanded section 19 is also known as the "velocity reduction zone" and is designed to minimize the quantities of particle entrainment from the fluidized bed. Each diameter of each horizontal cross-section of the expanded section 19 is greater than the diameter of straight section 14. The increased diameter causes a reduction in the speed of the fluidizing gas, which allows most of the entrained particles (catalyst and resin particles) to settle back into the fluidized bed, thereby minimizing the quantities of solid particles that are "carried over" from the fluidized bed (at a given value of fluidizing gas velocity) through the recycle gas line 31.

One or more temperature sensors 16 positioned in the fluidized bed are used with a control system (not shown in FIG. 3 but which can include processor 50 of FIG. 4) and the external cooling loop to control the fluidized bed temperature Trx near the process set-point. All or some of bed temperature sensors may be resistance sensors. Relatively warm reactor gas (whose temperature has increased during its flow through reactor 110) is withdrawn from outlet 33 and is pumped by compressor 32 to cooler 30, wherein the temperature of the gas (the cooling fluid) is reduced. The relatively cool fluid (which may contain condensed liquid) flows out from cooler 30 to reactor inlet 34 and into the fluidized bed. Temperature sensors (not shown) near the inlet and outlet of cooler 30 provide feedback to the control system to regulate the amount by which cooler 30 reduces the temperature of the fluid entering reactor 110.

Reactor 110 can be implemented as a mLLDPE (metallocene-catalyzed, linear low-density polyethylene) reactor with straight section 14 having height 47 feet, six inches.

The FIG. 3 system also includes "skin temperature" sensors 108 (typically implemented as thermocouple sensors having fast response design), mounted in positions along straight section 14 of the reactor wall so as to protrude into the bed from the reactor wall by a small amount (e.g., one eighth to one quarter of an inch). Sensors 108 are configured and positioned to sense the temperature $T_w$ of the resin at or near to the wall of reactor 110 during operation.

Each bed temperature sensor 16 in the fluidized bed is positioned and configured to sense bed temperature during reactor operation at a location within reactor 110 away from the reactor wall. Each bed temperature sensor is mounted so as to protrude into the bed (e.g., 6 to 18 inches away from the reactor wall) more deeply than does each sensor 108.

The FIG. 3 system also includes one or more acoustic sensors (probes) 111, positioned and configured to produce the acoustic data used to perform typical embodiments of the inventive method. In cases in which bed temperature sensors 16 are employed to generate temperature data for determining a predetermined relation (between values of an acoustic condition in the reactor and values of a stickiness control temperature) in accordance with typical embodiments of the inventive method, acoustic probes 111 are preferably positioned at (or very near to) the location at which bed temperature sensors 16 are mounted, so that both probes 111 and sensors 16 measure conditions at the same (or approximately the same) location within the reactor. In some embodiments, one bed temperature sensor 16 and one acoustic probe 111 are used (to determine the predetermined relation), the bed temperature sensor is a bed control thermocouple, and both the bed control thermocouple 16 and the acoustic probe 111 are positioned at an elevation of about 21 ft above distributor plate 12 (e.g., where straight section 14 has a height of 47 feet, six inches).

Other sensors and optionally also other apparatus are employed in some embodiments to measure other reaction parameters during a polymerization reaction. Such other reaction parameters preferably include instantaneous and bed-averaged resin product properties (e.g., melt index and density of the polymer resin product being produced by the FIG. 3 system during a polymerization reaction). Resin product properties are conventionally measured by periodically sampling the resin as it exits the reactor (e.g. once per hour), and performing the appropriate tests in a quality control laboratory.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatograph system 40.

It is well known how to control various process control variables (e.g., to control gas phase composition within reactor 110, the concentration of induced condensing agents (ICAs) and comonomer introduced into reactor 110, partial pressure of at least one reactant (e.g., ethylene) introduced into reactor, and the type and properties of each catalyst introduced into reactor 110, and to use elements 30 and 32 in the manner described above to control temperature) to control various reactions performed by the FIG. 3 system. For example, it is known how to control a polymerization reaction during a transition by controlling process control variables such that the product (granular polymer resin) has properties compliant with an initial specification set at the start of the transition, the product produced during the transition ceases to comply with the initial specification set at a first time, and the product has properties compliant with a final specification set at the end of the transition.

In some embodiments, the inventive method includes a step of controlling the reaction in response to a stickiness control temperature value, typically in an effort to prevent (and preferably to prevent) the occurrence of sheeting or another discontinuity event. For example, in response to a stickiness control temperature indicating excessive resin softening, the reaction can be controlled in an effort to prevent dome sheeting. (In this case a response could include reducing the superficial velocity of fluidizing gas.) For another example, in response to a stickiness control temperature indicating an approach to conditions of excessive stickiness in the fluidized bed, the reaction can be controlled to maintain the reactor in a stable, non-sticking condition.

Figure 4:
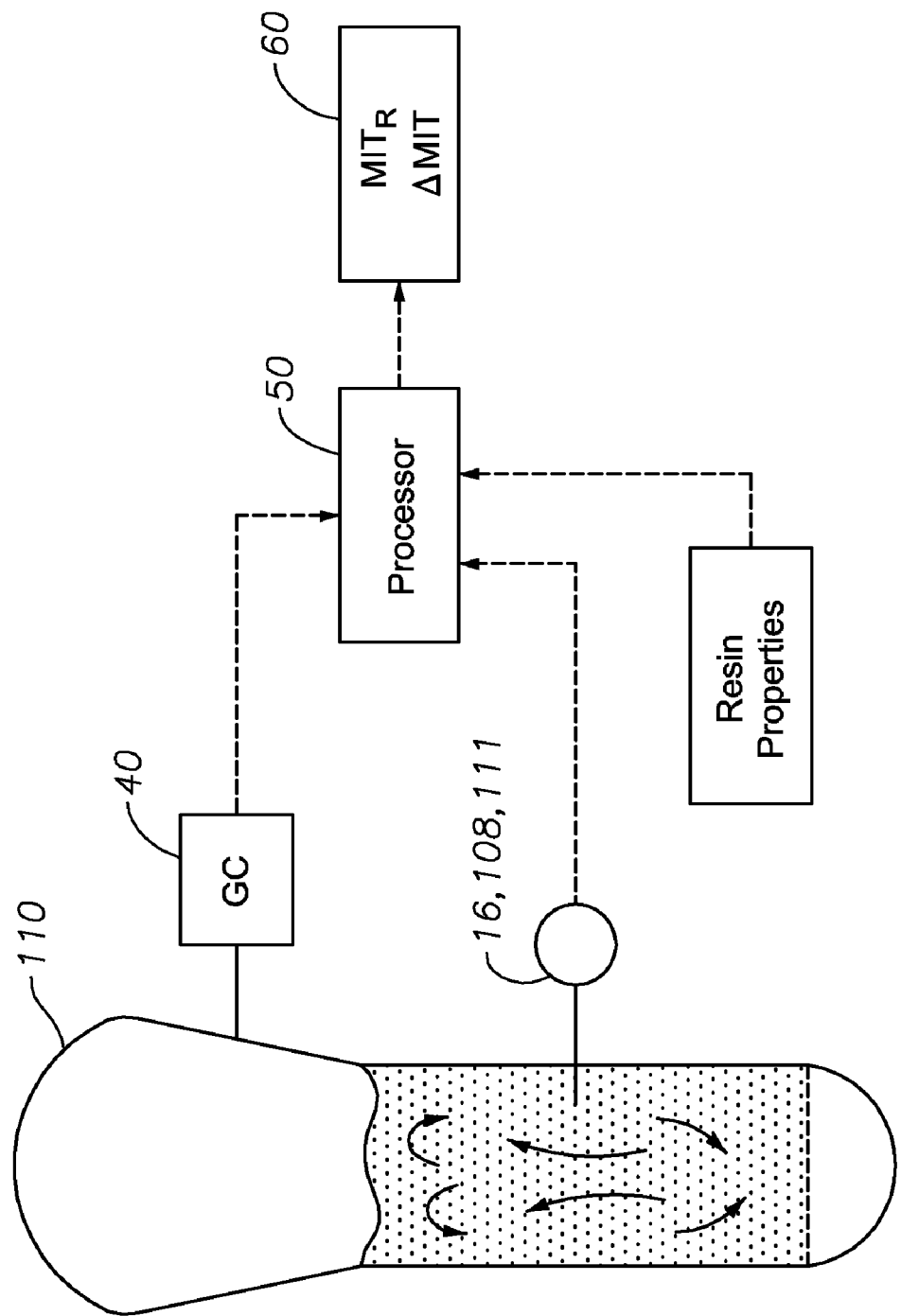
FIG. 4 is a block diagram of some elements of the FIG. 3 system and additional elements for implementing a process for calculating control variables $MRT_R$ and dMRT. These parameters can be calculated using on-line data from the reaction system and can be used to provide a real-time estimate of the degree of resin stickiness in the fluid bed.

In typical embodiments, a reaction (e.g., a steady-state reaction and/or a reaction transition) performed by a polymerization reactor is controlled by adjusting (or regulating) controlling process variables in response to a stickiness control temperature value (or a sequence of stickiness control temperature values determined in accordance with the invention). One or more stickiness control temperature values are determined in on-line fashion, either based on the output of at least one acoustic sensor (e.g., acoustic probe 111 of FIG. 3) and optionally also other apparatus, or with error checking or based on the output of at least one acoustic sensor. Processor 50 of FIG. 4 is an example of a processor programmed to generate the stickiness control temperature values in accordance with any embodiment of the invention in response to acoustic data measured during a reaction, and to control the reaction in response to these temperature values. Processor 50 is optionally also programmed to generate the predetermined relation (between values of a variable acoustic condition in the reactor and values of a stickiness control temperature) relied upon in typical embodiments of the invention, in response to reaction parameters (e.g., parameters determined by the output of sensors 16, 108, and/or 111, resin properties measurements (density and MI), and the output of process gas chromatograph 40) measured during a set of reactions. Processor 50 may be a separate, stand alone processor, or it may be integral with other process control computers that are conventionally used to monitor and control the reactor system.

In a class of preferred embodiments, relevant measured data from all reaction monitoring instruments and relevant calculated or otherwise determined parameters (e.g., stickiness control temperature and critical temperature values) are combined into an integrated computer display for presentation to users (e.g., plant operators). Such a computer display (e.g., display 60 of FIG. 4, generated by appropriately programmed processor 50) can be supplemented by process alarms or advisory notices (that may be presented to the users as part of the display 60) to warn the users of conditions in the process that may be approaching those that will lead to sheeting (e.g., wall or dome sheeting) or other discontinuity events. The alarms or advisory notices can also be combined with recommended control actions to avoid a discontinuity event. For example, in response to the approach of the stickiness control temperature (determined so as to be the above-defined parameter dMIT) to a critical range (e.g., 6 to 8° C.), an advisory could be generated with a recommendation to reduce the reactor temperature and/or isopentane concentration to avoid excessive resin stickiness and the resulting dome sheeting.

In a class of embodiments, the invention is a method is for monitoring a polymer resin-producing polymerization reaction in a fluidized bed reactor (e.g., a polymerization reaction in reactor 110 of FIG. 3) to determine a current value of a stickiness control temperature, in on-line fashion from measured acoustic data using a predetermined relation between values of a variable acoustic condition in the reactor and values of the stickiness control temperature. The stickiness control temperature is a temperature indicative of a characteristic of melting behavior of polymer resin in the reactor, and is preferably indicative of a characteristic of melting behavior of polymer resin in the reactor in the presence of at least one diluent. For example, the stickiness control temperature may be a parameter related to resin sticking temperature or imminence of resin stickiness in the reactor, approach of resin in the fluid bed to a sticky condition, degree of resin stickiness in the reactor, and/or imminent occurrence or likelihood of occurrence of resin sheeting or another discontinuity event. In some cases, the stickiness control temperature is of the type described in above-referenced U.S. Pat. No. 7,122,607. In other cases, it can be determined in another manner (e.g., from temperature data generated in on-line fashion using thermocouple sensors). Preferably the method also includes a step of controlling the reaction in response to the stickiness control temperature in an effort to prevent the occurrence of sheeting or another discontinuity event. In preferred embodiments in this class, the method includes the steps of:

(a) in on-line fashion, generating acoustic data indicative of at least one value of the acoustic condition in the reactor (e.g., using acoustic probe(s) 111 of FIGS. 3 and 4); and (b) in on-line fashion, determining the current value of the stickiness control temperature in the reactor from the acoustic data and the predetermined relation (e.g., using appropriately programmed processor 50 of FIG. 4).

In preferred embodiments, the stickiness control temperature is a reduced melt reference temperature, $MRT_R$, as defined above, or $dMRT=\Delta MRT=Trx-MRT_R$, where Trx denotes current reactor temperature. In some other embodiments, the stickiness control temperature is a reduced melt initiation temperature, $MIT_R$, or dMIT, as also defined above.

Preferably, steps (a) and (b) are performed repeatedly (e.g., on an ongoing basis) during the reaction to determine a sequence of current values of the stickiness control temperature. Each stickiness control temperature value can be an indication or estimate of the temperature at which significant melting of the polymer product in the fluidized bed would begin to occur under current reaction conditions.

In a class of preferred embodiments, the predetermined relation (between the values of the acoustic condition and the values of the stickiness control temperature) recited in step (b) is predetermined by a method including the steps of:

(c) determining reference stickiness control temperatures for a set of polymerization reactions in the reactor, wherein each of the reference stickiness control temperatures is determined from a different measured reaction parameter set indicative of one of the reactions (in some embodiments, each of the reactions differs from each other one of the reactions by producing a different polymer product and/or producing polymer product under different condensable diluent gas conditions, and each measured reaction parameter set is indicative of a different one of the reactions);

(d) identifying values of a reference acoustic condition in the reactor from measured acoustic data indicative of the reactions, where the reference acoustic condition in the reactor has one of said values during each one (e.g., a different one of said values in each different one) of the reactions and each of said values corresponds to the reference stickiness control temperature in the reactor for said one of the reactions (in some embodiments, the measured acoustic data for each one of the reactions is included in the measured reaction parameter set indicative of said one of the reactions); and (e) determining the predetermined relation (between the values of the acoustic condition and the values of the stickiness control temperature) from the reference stickiness control temperatures and the values of the reference acoustic condition.

In some embodiments, step (e) includes the steps of determining a plot of data values by plotting the reference stickiness control temperatures relative to the corresponding values of the reference acoustic condition, and fitting a curve to the plot. The curve determines the predetermined relation (also, when generated using acoustic emission data from a single acoustic sensor, the curve is a calibration curve of the type determined in some embodiments of the inventive method as described elsewhere herein). Alternatively, the data values are processed (e.g., using appropriately programmed processor 50 of FIG. 4) to accomplish the mathematical equivalent of these steps.

FIG. 1 is an example of such a plot. Each plotted data value in FIG. 1 characterizes a polymerization reaction under a different set of reaction conditions, and is determined from a different set of instantaneous values of a reaction parameter set measured for the reaction. Alternatively, a plot similar to the FIG. 1 plot could be generated from sets of bed averaged values of a reaction parameter set measured for such a reaction. The data plotted in FIG. 1 were generated from data generated by monitoring a commercial implementation of gas phase, fluidized bed reactor 110 of FIG. 3, fitted with acoustic emission ("AE") sensors 111 obtained from Process Analysis and Automation LTD. The reactor had an internal diameter of 14.5 feet (4.42 m) and operated with a bed height of 44.5 to 47 feet (13.5 to 14.3 m) during the monitoring. The AE sensors were attached to the reactor's exterior with an adhesive provided by the manufacturer. Data from the AE sensors was processed by a Process Analysis and Automation Granumet 2.0, 8-channel system. The sensors were tuned for narrow-band detection centered at 190 kHz, and rated intrinsically safe for operation in an atmosphere potentially containing a combustible mixture of hydrocarbons.

In FIG. 1, the position of each plotted data value along the vertical axis indicates a value of an acoustic condition (a reference acoustic condition of the type recited above in step (d)) in the fluidized bed of reactor 110 measured using one of acoustic sensors 111 of FIG. 3 during the reaction. Position along the vertical axis of FIG. 1 is in units of volts, and indicates the AE output of sensor 111 which in turn indicates the amplitude of acoustic energy in reactor 110 (near to sensor 111) at a time when the plotted stickiness control temperature characterizes the reaction.

In FIG. 1, the position of each plotted data value along the horizontal axis indicates a stickiness control temperature for the reaction, and is one of the "reference stickiness control temperatures" recited in above-mentioned step (c). Each such stickiness control temperature is a value $dMIT=\Delta MIT=Trx-MIT_R$, where Trx denotes current reactor temperature, and $MIT_R$ is a reduced melt initiation temperature generated as described in the above-referenced MIT application. Specifically, each $MIT_R$ value is a reduced melt initiation temperature for the polymer product of a polymerization reaction in the presence of the at least one condensable diluent gas, and is generated using a melt initiation temperature depression model, from a measured reaction parameter set indicative of the reaction (measured using sensors 16 and 111 and system 40 of FIGS. 3 and 4) and a dry melt initiation temperature value for the polymer product. In variations on the inventive method, different or additional sensors (e.g., skin temperature sensors 108) are used to generate each measured reaction parameter set. The melt initiation temperature depression model identifies an estimated degree of depression of the dry melt initiation temperature due to presence of at least one diluent with the polymer, and implements the well-known Flory melt depression equation. In FIG. 1, the stickiness control temperatures are plotted in units of degrees F.

As apparent from FIG. 1, there is a clear correlation between the AE readings and the calculated dMIT values: intervals of high dMIT (high stickiness) operation correlate with lower values of the AE readings. The fluid bed thus became quieter as the level of stickiness increased. In other words, the data plotted in FIG. 1 indicate that dMIT (the stickiness control temperature) is a non-increasing function of the acoustic condition value. More specifically, FIG. 1 indicates that dMIT is a decreasing function over much of the range of dMIT, in the sense that a decrease in the acoustic condition value (indicating a decrease in measured acoustic energy in the reactor) corresponds to an increased dMIT (stickiness control temperature) value.

The AE sensor 111 used to generate the plotted data was located at an elevation of 21 feet (6.4 m) above the reactor's distributor plate 12 (equivalent to 1.45 reactor diameters above the distributor plate). Data from this AE sensor was tabulated for an approximately two-month period of steady-state reactor operation of the fluidized bed reactor system (under a variety of operating conditions, producing a wide range of polymer product densities and melt indices at a wide range of production rates) with Exceed (metallocene) catalyst, and correlated with dMIT values calculated over the same time period. The results shown in FIG. 1 determine a calibration curve for the AE sensor (the curve, which may be a line or polynomial of higher degree, can be fitted to the FIG. 1 data in any of various ways that will be apparent to those of ordinary skill in the art).

The AE sensor (mounted at the 21 foot elevation) employed to generate AE data plotted in FIG. 1 was mounted near to a temperature sensor 16 that was used to monitor and control the fluid bed's operating temperature (including by generating bed temperature data used to generate the dMIT values plotted in FIG. 1). It is believed that the common location of the AE sensor and temperature sensor (both mounted at substantially the same elevation) contributed to the strength of the strong correlation between data from the AE sensor and the values of dMIT calculated using temperatures measured using the temperature sensor. It is believed that this strong correlation occurred because the reactor conditions (including temperature and the measured acoustic condition) at this acoustic probe elevation most closely corresponded to the measured conditions (e.g., the bed temperatures measured by the sensor 16) employed to perform the dMIT calculation.

As apparent from FIG. 1, the AE readings were approximately constant at dMIT values less than 0 degrees F. This indicates that at conditions far from the stickiness limit (assuming a limiting value of dMIT of about 15 degrees F.), the AE sensor was relatively insensitive to changes in dMIT.

It is also apparent that the calibration curve determined from the FIG. 1 data has a substantial negative slope for conditions of higher stickiness (dMIT values greater than about 0 degrees F.). This indicates that the AE readings were sensitive to changes in dMIT. The sensitivity (i.e., the slope of the calibration curve) is approximately constant from dMIT=0 degrees F. to the stickiness limit (dMIT=15 degrees F.). This indicates that the AE sensor has sufficient sensitivity to enable its use as an effective surrogate (or back-up) for the dMIT calculation.

A predetermined relation between measured values of an acoustic condition and determined stickiness control temperature values can be determined from the data plotted in FIG. 1 in any of a variety of ways. For example, it can be determined by fitting a curve (e.g., a line or polynomial of higher degree) to the FIG. 1 data in any of various ways that will be apparent to those of ordinary skill in the art. The fitted curve determines a functional relation between the plotted measured acoustic condition values and determined stickiness control temperature values, and this functional relation is taken as the "predetermined relation."

Consider a typical embodiment of the invention that uses a curve that has been fitted to FIG. 1 data. The curve determines a predetermined relation between the plotted values of the acoustic condition and the corresponding plotted values of stickiness control temperature (i.e., $y=f(x)$, where x is an acoustic condition value, y is a corresponding stickiness control temperature value, and $f(x)$ is the functional relation between the acoustic condition and stickiness control temperature values determined by the curve fitted to the FIG. 1 data). In this embodiment, the output of acoustic probe(s) 111 of FIGS. 3 and 4 is monitored in on-line fashion to generate acoustic data indicative of a current value of an acoustic condition in reactor 110. For example, the acoustic data may consist of an acoustic probe output value equal to 1.2 volts (as marked along the vertical axis of FIG. 1). Using an appropriately programmed processor 50 of FIG. 4, the corresponding current value of the stickiness control temperature is identified in on-line fashion as the stickiness control temperature value along the curve for the acoustic probe output value of 1.2 volts (i.e., the value y determined by the functional relation $y=f(x)$ for $x=1.2$ volts).

To generate the data plotted in FIG. 1, one bed temperature sensor 16 (implemented as a bed control thermocouple mounted to protrude about six inches into reactor 110), one acoustic sensor 111, and system 40 were used to measure reaction parameters. Each reaction took place in reactor 110, implemented so that straight section 14 had a height of 47 feet, six inches. Both the bed control thermocouple 16 and acoustic probe 111 were mounted at substantially the same elevation, 21 ft above distributor plate 12. Alternatively, other acoustic probes (or the same acoustic probe positioned at a different elevation) can be used to provide acoustic (AE) data indicative of a clear correlation between stickiness control temperature and acoustic condition in the reactor (with the resulting differences in measured acoustic data resulting from the different local reactor conditions). It is expected that in some embodiments of the inventive method, calibration differences between acoustic probes may be present without preventing determination of clear correlation between measured acoustic condition values and determined stickiness control temperature values.

The inventors have recognized that the predetermined relation (between values of an acoustic condition measured during polymerization reactions and stickiness control temperature values for such reactions) employed in embodiments of the invention may depend on the type of polymer product produced in the polymerization reactions. Consider a set of polymerization reactions including at least a first subset and a second subset of polymerization reactions, with each polymerization reaction in the first subset producing a polymer product in a first product class and each polymerization reaction in the second subset producing a polymer product in a second product class. For example, the first product class may comprise a number of different grades of very low density polyethylene (VLDPE), and the second product class may comprise a number of different grades of polyethylene none of which is a VLDPE. Some embodiments of the inventive method employ a first predetermined relation (between values of an acoustic condition measured during polymerization reactions in the first subset and stickiness control temperature values for such reactions) for reactions in the first subset and a second predetermined relation (between values of the acoustic condition measured during reactions in the second subset and stickiness control temperature values for such reactions) for reactions in the second subset. Some such embodiments include the steps of:

determining reference stickiness control temperatures for polymerization reactions in the first subset and additional reference stickiness control temperatures for polymerization reactions in the second subset, including by determining each of the reference stickiness control temperatures from a different measured reaction parameter set indicative of one of the polymerization reactions in the first subset and each of the additional reference stickiness control temperatures from a different measured reaction parameter set indicative of one of the polymerization reactions in the second subset;

identifying values of a reference acoustic condition in the reactor from measured acoustic data indicative of the reactions in the first subset and measured acoustic data indicative of the reactions in the second subset, where the reference acoustic condition in the reactor has one of said values during each one (e.g., a different one of said values in each different one) of the reactions and each of said values corresponds to a reference stickiness control temperature in the reactor for said one of the reactions (in some embodiments, the measured acoustic data for each one of the reactions is included in the measured reaction parameter set indicative of said one of the reactions); and determining the first predetermined relation (between the values of the acoustic condition measured during the reactions in the first subset and stickiness control temperature values for such reactions) for the reactions in the first subset from the reference stickiness control temperatures and at least some of the values of the reference acoustic condition, and determining the second predetermined relation (between the values of the acoustic condition measured during the reactions in the second subset and stickiness control temperature values for such reactions) for the reactions in the second subset from the additional reference stickiness control temperatures and at least some of the values of the reference acoustic condition.

In some such embodiments, the third step includes steps of determining a plot of data values for each subset of the reactions (relating reference stickiness control temperature and reference acoustic condition values) and fitting a curve to each plot. For example, this may be done by plotting the reference stickiness control temperatures relative to the corresponding reference acoustic condition values, fitting a curve to the resulting first plot, plotting the additional reference stickiness control temperatures relative to the corresponding reference acoustic condition values, and fitting a curve to the resulting second plot. Alternatively, the data values are processed (e.g., using appropriately programmed processor 50 of FIG. 4) to accomplish the mathematical equivalent of these steps. In FIG. 1, the plotted data values (each having triangular shape) within region "VLDPE" are an example of such a first plot. The plotted data values (each having square shape) outside region "VLDPE" are an example of such a second plot. In FIG. 1, each plotted data value having triangular shape lies within region VLDPE and characterizes a different polymerization reaction producing a grade of very low density polyethylene (VLDPE), and is determined from a set of instantaneous values of a reaction parameter set measured for the reaction, and each plotted data value outside region VLDPE characterizes a different polymerization reaction producing a grade of LLDPE (linear low density polyethylene) that is not a VLDPE, and is determined from a set of instantaneous values of a reaction parameter set measured for that reaction. It should be appreciated that in FIG. 1, each plotted value having triangular shape characterizes a different reaction producing a grade of VLDPE, each square-shaped plotted value characterizes a different reaction producing a grade of LLDPE, and the region "VLDPE" surrounds not only the plotted VLDPE values but also some plotted LLDPE values (in order to simplify the region's contour).

It is apparent from FIG. 1 that the data values indicative of reactions that produce VLDPE grades are offset from the other data values (i.e., a linear curve fitted to data within region VLDPE is generally parallel to but offset from a linear curve fitted to data outside region VLDPE, for the same range of acoustic condition values). This effect is believed to be caused by the slow crystallization kinetics of VLDPE grades relative to the faster crystallization kinetics of other polyethylene grades. FIG. 1 shows that the critical temperature (dMIT) alarm point (i.e., the value of dMIT at which corrective action should be taken to prevent a discontinuity event) for VLDPE grades is approximately 5 degrees F. lower than the dMIT alarm point for typical film grades of polyethylene (non-VLDPE grades) which crystallize much more rapidly.

Thus, another aspect of the invention is determination of a stickiness control temperature (sometimes referred to herein as Softening Initiation Point or SIT) for a reaction producing VLDPE using a melt reference temperature depression model that accounts for the crystallization kinetics (i.e., the slow crystallization kinetics) of VLDPE resin. In preferred embodiments, the melt reference temperature depression model is a melt initiation temperature depression model that implements the Flory equation. In some embodiments, the inventive method relies upon a predetermined relation between values of an acoustic condition in a polymerization reactor producing VLDPE and values of a stickiness control temperature, SIT (of the type defined above in this paragraph), for the reaction in the reactor. In such embodiments, the method includes the steps of:

in on-line fashion, generating acoustic data indicative of at least one value of the acoustic condition in the reactor; and in on-line fashion, determining a current value of the stickiness control temperature, SIT, from the acoustic data and the predetermined relation.

Preferably, step (c) of the inventive method (described above in this section of the specification) includes a step of determining each of the reference stickiness control temperatures from a melt initiation temperature depression model that identifies an estimated degree of depression of a dry melt initiation temperature (dry MIT), or a melt reference temperature depression model that identifies an estimated degree of depression of a dry melt reference temperature (dry MRT), for a polymer product produced by the relevant polymerization reaction due to presence (in the reactor with the polymer product) of at least one diluent. Regardless of the temperature depression model employed, it is typically preferable that step (c) determine the reference stickiness control temperatures for a set of polymerization reactions characterized by a broad range of product densities and melt indices, and preferably also a broad range of production rates.

In some embodiments, step (c) determines a reference stickiness control temperature for each reaction by a method including the steps of:

(i) generating a measured reaction parameter set for each of the reactions, including by monitoring parameters of the reaction, including at least reactor temperature (e.g., using sensors 16 and/or 108), at least one resin property (e.g., resin density) of a polymer product of the reaction (e.g., using system 40 of FIG. 3), and concentration of at least one condensable diluent gas in the reactor (e.g., using system 40 of FIG. 3);

(ii) determining a dry melt initiation temperature (dry MIT) of a dry version of the polymer product from the at least one resin property, using a predetermined correlation between resin melting temperature and said at least one resin property; and (iii) using a melt initiation temperature depression model to determine the reference stickiness control temperature from at least some of the parameters monitored in step (i) and the dry melt initiation temperature, said melt initiation temperature depression model identifying an estimated degree of depression of the dry melt initiation temperature due to presence of at least one diluent with the polymer product. The reference stickiness control temperature can be a reduced melt initiation temperature for the polymer product in the presence of the at least one condensable diluent gas, or it can be a stickiness monitoring and control parameter determined by such a reduced melt initiation temperature and a current value of the reactor temperature during the relevant one of the reactions. In typical embodiments, the melt initiation temperature depression model implements the well-known Flory melt depression equation. In some embodiments, the stickiness monitoring and control parameter is a value dMIT that is at least substantially equal to $Trx-MIT_R$, where Trx is the current value of reactor temperature, and $MIT_R$ is a reduced melt initiation temperature determined (using the melt initiation temperature depression model) from at least some of the parameters monitored in step (i) and the dry melt initiation temperature in step (ii). Preferably, the melt initiation temperature depression model identifies an estimated degree of depression of the dry melt initiation temperature due to presence of at least one condensable diluent gas, and takes into account at least one of partial pressure of ICA, comonomer, and at least one isomer of the comonomer in the reactor. For example, in some cases in which the resin is polyethylene, the ICA is iC5 and the comonomer (or isomer thereof) is a C6 isomer. C6 isomers can accumulate to high levels on commercial reactors equipped with effective recovery systems, leading to a substantial impact on reduced melt initiation temperature.

Steps (ii) and (iii) can be performed in any of a variety of ways, including by accessing one or more look-up tables prepared in accordance with the predetermined correlation or the model.

Appropriate engineering methods and correlations should be used to implement step (iii) to determine a reference stickiness control temperature. Typically, the reference stickiness control temperature is determined as a function of reactor bed temperature and comonomer and diluent concentrations in the reactor. We describe below a method (suitable in many applications) for determining a reference stickiness control temperature (a reduced melt initiation temperature) using the well-known Flory equation. The method employs measured values of condensable gas concentrations in the reactor (comonomer, ICA, and any other condensable inerts in the reactor) and expressions for solubilities of hydrocarbons in the polymer to compute an expected depression (or reduction) in the polymer melting curve and MIT.

In some implementations, the dry melt initiation temperature (MIT) value is a temperature at which the polymer resin in the reactor is expected to begin to melt with the reactor operating at normal pressure and gas velocity but in the presence of substantially pure nitrogen rather than any significant amount of condensable diluent gas that is actually present in the reactor during the reaction. Typically, the dry MIT value is determined for the particular polymer in the reactor using a correlation of dry MIT values versus polymer properties (e.g., density, MI, etc.). The correlation is developed from dry MIT values that have been previously determined for the full range of polymers (of different density, MI, etc.) expected to be produced in the reactor. The polymer properties (density, MI, etc.) are provided as input to the correlation, and the dry MIT value is provided as the output.

Alternatively, the dry MIT value is determined for the polymer in the reactor using a database of dry MIT values. The database is populated with dry MIT values that have been previously determined for the full range of polymers expected to be produced in the reactor. The polymer properties (density, MI, etc.) are provided as input to the database, and the dry MIT value is provided as the output.

In some embodiments, the dry MIT values determined in step (ii) are determined using first melt DSC curves measured in the laboratory from a group of samples representative of the different types or grades of polymer resin that may be produced in the reactor. Suitable DSC (differential scanning calorimetry) data may be obtained by standard methods, well known to those skilled in the art. It is preferred, however, to use "first melt" data, that is data from previously unmelted granular polymer samples, since these samples are believed to be the most representative of the polymer as it exists in the reactor. Measured values of dry melt initiation temperatures determined from first-melt DSC measurements are set forth below in Table 1 for a group of low density polyethylene samples. The results of these measurements were correlated by the expression: $MIT=763.4\rho-1.7524\cdot\ln(MI)-606.09$, where $\rho$ represents the density of the polymer (in units of g/cc, ASTM), and MI represents the melt index, $I_2$, of the polymer (in units of dg/min, ASTM). This expression is used in some embodiments of the invention to predetermine dry melt initiation temperatures for polymers not specifically listed in Table 1.

Figure 2:
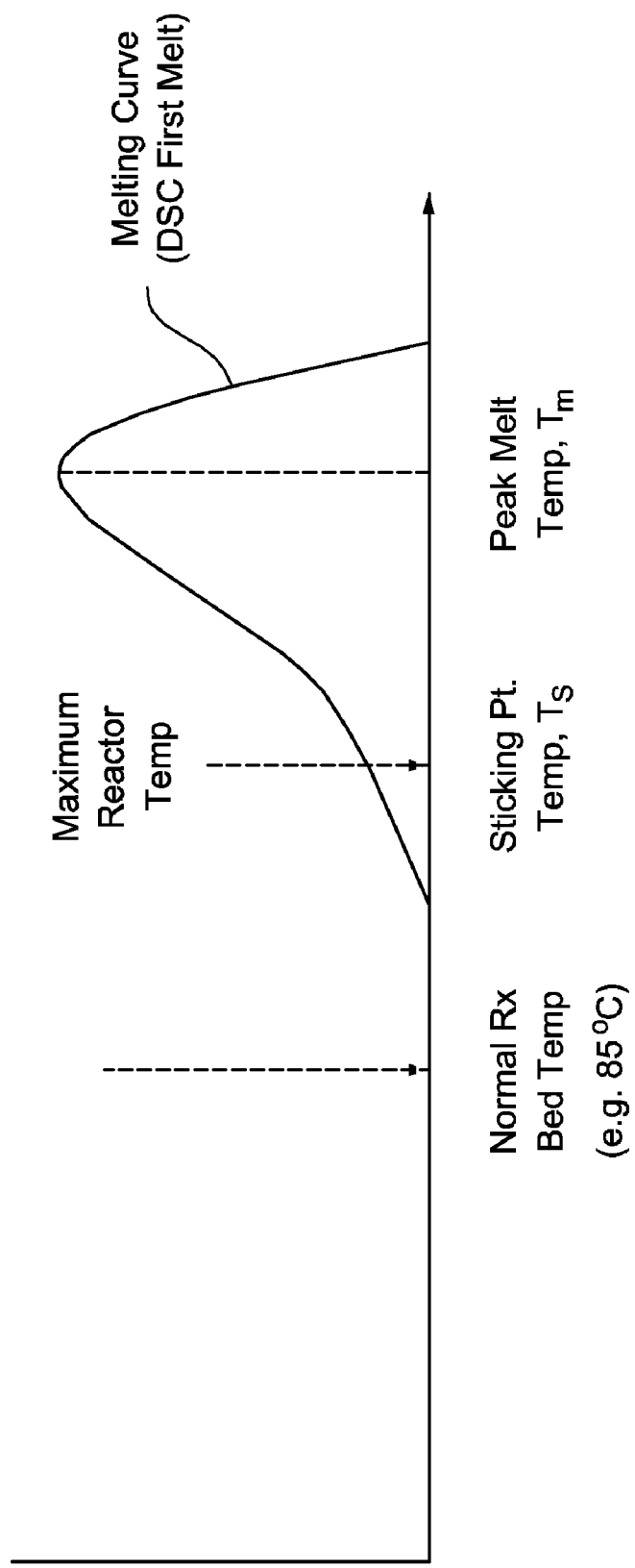
FIG. 2 is an approximation of a typical DSC melting curve of a polymer illustrating a typical reactor temperature and the limiting resin sticking temperature (Ts) relative to the DSC melting curve.

FIG. 2 is an approximation of a typical DSC melting curve of a polymer. The melting temperature "Tm" is taken as the peak of the melting curve. During a polymerization reaction, the reactor bed temperature ("Rx Bed Temp") is normally operated considerably below the melting temperature as shown. For a typical LLDPE film resin (0.917 g/cc density, melt index of 1 dg/min) the melting temperature of the polymer is in the range of 119 to 127° C. (as measured dry, without dissolved components). For these grades the bed temperature would normally be set at 84 to 87° C. Stickiness in the polymer would be induced if the reactor bed temperature were increased to the point at which it would begin to overlap the polymer melting curve as shown in the figure. For Ziegler-Natta catalyzed resins, stickiness occurs when approximately 15% overlap occurs (i.e. 15% of the crystalline fraction of the polymer melted). For metallocene catalyzed resins, a higher degree of overlap is required to induce stickiness. While the exact number is not known for metallocene, it is believed to be in the range of 30 to 40%.

In a broader class of embodiments, step (c) determines a reference stickiness control temperature for each reaction by a method including the steps of:
  (i) generating one said measured reaction parameter set for each of the reactions, including by monitoring parameters of the reaction, including at least reactor temperature, at least one resin property (e.g., resin density) of a polymer product of the reaction, and concentration of at least one condensable diluent gas in the reactor;
  (ii) determining a dry melt reference temperature (dry MRT) of a dry version of the polymer product from the at least one resin property, using a predetermined correlation between resin melting temperature and said at least one resin property; and
  (iii) using a melt reference temperature (MRT) depression model to determine the reference stickiness control temperature from at least some of the parameters monitored in step (i) and the dry melt reference temperature, said MRT depression model identifying an estimated degree of depression of the dry MRT due to presence of diluent with the polymer product. The reference stickiness control temperature can be a reduced melt reference temperature for the polymer product in the reactor (a temperature characteristic of melting behavior of the polymer product in the presence of diluent, e.g., condensable diluent gas or gases) or it can be a stickiness monitoring and control parameter determined by such a reduced melt reference temperature and a current value of the reactor temperature during the relevant one of the reactions. The reduced melt reference temperature is at least substantially equal to the difference between the dry MRT and a melt reference temperature depression value, "D," where D is a temperature by which the dry MRT is depressed by the presence of diluent (e.g., condensable diluent gas or gases) with the polymer product in the reactor. In some embodiments, the stickiness monitoring and control parameter is a value dMRT that is at least substantially equal to $Trx-MRT_R$, where Trx is the current value of reactor temperature, and $MRT_R$ is a reduced melt reference temperature determined (using the MRT depression model) from at least some of the parameters monitored in step (i) and the dry melt reference temperature in step (ii). Preferably, the MRT depression model identifies an estimated degree of depression of the dry melt reference temperature due to presence of at least one condensable diluent gas, and takes into account at least one of partial pressure of ICA, comonomer, and at least one isomer of the comonomer in the reactor. Steps (ii) and (iii) can be performed in any of a variety of ways, including by accessing one or more look-up tables prepared in accordance with the predetermined correlation or the model.

The dry MRT is a distinct and measurable temperature that is characteristic of melting behavior of a dry version of the polymer resin (the polymer product), and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample;

a resin Hot Tack Initiation Temperature;

a phase change in dry granular polymer as measured by dilatometry;

a dry sticking temperature of granular polymer in a fluid bed;

a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith); or a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction.

In typical embodiments, the reference stickiness control temperature for each reaction is determined by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined MRT depression model. The processing can be performed in any of a variety of ways, including by accessing at least one database or look-up table prepared in accordance with the model. Typically, a dry melt reference temperature (dry MRT) is determined from the measured process data (e.g., using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

In typical embodiments, to implement the MRT depression model, data indicative of a dry melt reference temperature of each of a representative set of different types or grades of polymer resin that may be produced in the reactor are measured. Preferably, the density and melt index of the polymers in the set span a full range of polymer density and melt index values that may be produced using each catalyst type that may be used in the process. The measured data are typically then analyzed (and regressed) to provide a mathematical correlation of dry melt reference temperature as a function of polymer density and melt index, and also catalyst type (if required). Measured data indicative of the density and melt index of the polymer being produced, and also data indicative of the type of catalyst being used to produce the polymer (if required), can then be processed in on-line fashion using the correlation to determine a dry melt reference temperature for the polymer resin. Alternatively, dry melt reference temperature data, provided in the form of a predetermined database (a "Melt Reference Database") or look-up table, are accessed to identify a dry melt reference temperature for the polymer resin being produced. The database or look-up table preferably contains dry melt reference temperature data for each grade of polymer to be produced in the reactor so that the data can be conveniently accessed (e.g., in on-line fashion) by specifying density and melt index of the polymer being produced (and the catalyst being used in the reaction if required).

During fluid bed reaction transitions, conditions in a polymerization reactor can be adjusted to produce a new polymer grade of different density and/or melt index. In most cases, the adjustments in process conditions can be made fairly quickly, but some time is needed for the fluid bed to change over to the new resin properties. The time required to effect a complete transition is typically three or four bed turnovers. During a reaction transition, the bed-averaged properties (e.g., resin density and melt index) are not equal to the properties of the resin currently being produced (the "instantaneous production"). It is possible to determine the reference stickiness control temperature values in step (c) either from measured reaction parameter sets indicative of properties of the bed-averaged resin, or from measured reaction parameter sets indicative of properties of the instantaneous production.

Some embodiments of the present invention generate reference stickiness control temperature values (e.g., reduced melt initiation temperature values or dMIT values) based on bed-averaged parameters of steady-state polymerization reactions and use them to determine a predetermined relation (between acoustic condition and stickiness control temperature values) that is then used to characterize and control a steady-state reaction. To characterize and control transitions of such reactions, some embodiments generate reference stickiness control temperature values (e.g., reduced melt initiation temperature values or dMIT values) based on instantaneous reaction parameters and use them to determine a predetermined relation (between acoustic condition and stickiness control temperature values) that is then used to characterize and control reactions during transitions.

In another class of embodiments, the invention provides improved on-line monitoring of the degree or onset of resin stickiness in a gas phase, fluid bed polymerization reactor using acoustic emission ("AE") data indicative of at least one value of an acoustic condition in the reactor. The AE data are generated and used to determine a stickiness control temperature, which is a temperature indicative of a characteristic of melting behavior of polymer resin in the reactor (e.g., a current value of dMRT, dMIT, reduced melt initiation temperature, or reduced melt reference temperature as defined herein). Determining the stickiness control temperature in accordance with the invention using AE data (preferably using aspects of the teaching of the MRT application or MIT application) can provide the same quantitative accuracy as the monitoring methods described in the MRT and MIT applications (the "dMIT" and "dMRT" methods) while avoiding reliability issues associated with potentially erroneous data flowing into the dMIT or dMRT method calculations. In typical embodiments of the inventive method, at least one acoustic sensor generates AE data to back-up (e.g., provide error checking for) a stickiness control temperature determined in accordance with the dMIT or dMRT method and warn of risk of erroneous data flow into the dMIT or dMRT method calculations.

The inventors have found that there is normally a one-to-one relationship between a dMIT value (determined under a set of reaction conditions using the dMIT method) and an acoustic energy value (indicated by measured AE data) indicative of acoustic energy amplitude in the reactor under the same reaction conditions. Both indicators of stickiness normally track together but in opposite directions in the sense that as the degree of stickiness increases, the acoustic energy value decreases and the dMIT value increases. Use of erroneous data in the dMIT method calculations is thus indicated whenever the two indicators deviate from their normal relationship and a warning can be provided to operators in response to such a deviation. Such a warning would minimize the risks associated with potentially incorrect dMIT calculations. In particular, it would minimize the risks associated with incorrectly calculated dMIT values that are too low, which could fail to indicate when conditions of excessive stickiness were being approached in the reactor.

Some embodiments of the invention generate AE data indicative of values of an acoustic condition in the reactor at least two different locations in the reactor. Typically, the data are generated using AE sensors at different elevations along the fluid bed. The AE data are used to determine stickiness control temperatures, each of which is a temperature (e.g., current value of dMRT, dMIT, reduced melt initiation temperature, or reduced melt reference temperature as defined herein) indicative of a characteristic of melting behavior of polymer resin at one of the locations in the reactor, or to determine a stickiness control temperature indicative of a characteristic of melting behavior of polymer resin in the reactor but not at a specific location in the reactor. Preferably, at least one AE sensor is located adjacent to each position known to be a potential point of sheet formation in the reactor. Such positions typically include the lower and upper sections of the fluid bed and the reactor expanded section. Stickiness control temperature(s) determined from the AE data, and preferably also stickiness control temperature(s) otherwise determined, provide an indication as to the approach to conditions of limiting stickiness at the location of at least one (or a subset) of the AE sensors, and as to associated potential for sheet formation at each such location.

The inventors have recognized that AE data, generated using acoustic emission sensors properly positioned on fluid bed polymerization reactors, correlate well with dMIT values (and other stickiness control temperature values) generated in on-line fashion in response to monitored reaction parameter data. This one-to-one correlation represents an important finding and provides a technical basis for a class of embodiments of the invention. The one-to-one correlation shows that, although their methods of operation are completely different, the dMIT method and AE sensors effectively measure the same thing: the degree or onset of resin stickiness in the fluid bed. The combination of dMIT values and AE data can therefore be used as a redundant, complimentary system for more reliable determination of degree of resin stickiness, and a more accurate indicator of approach to conditions of limiting stickiness in the fluid bed.

In a class of embodiments, the inventive method employs at least one AE sensor and a predetermined relation between values of acoustic energy in the reactor (e.g., at one or more locations in the fluid bed) and values of a stickiness control temperature (e.g., at the same location(s) in the bed) to provide error checking for determination of the stickiness control temperature. The stickiness control temperature is a temperature indicative of a characteristic of melting behavior of polymer resin in the reactor (preferably, a characteristic of melting behavior of polymer resin in the reactor in the presence of at least one diluent). In these embodiments the method includes the steps of:

(a) in on-line fashion, determining a current value of the stickiness control temperature (e.g., a current value of dMRT, dMIT, reduced melt initiation temperature, or reduced melt reference temperature, as defined herein);

(b) in on-line fashion, generating acoustic emission ("AE") data indicative of an acoustic energy value using each AE sensor; and (c) determining from the predetermined relation an expected value of the stickiness control temperature corresponding to the acoustic energy value, and determining whether the current value of the stickiness control temperature determined in step (a) is consistent with the expected value of the stickiness control temperature.

Preferably, step (c) includes the step of asserting a warning (e.g., displaying a warning or producing an audible warning) in response to determining that the current value of the stickiness control temperature determined in step (a) is inconsistent with (e.g., differs by more than a predetermined amount from) the expected value of the stickiness control temperature. Preferably, step (a) includes the steps of performing a dMIT or dMRT method calculation to generate the current value of the stickiness control temperature in response to monitoring data indicative of at least one parameter of the reaction (typically including concentration of at least one condensable diluent gas in the reactor) and the warning is an indication to reactor operators of unacceptable level of risk of error in the monitoring data. In some cases, the warning is communicated by a process control computer normally used to monitor and control reactor operations. In response to the warning, plant operators may begin troubleshooting the monitored reaction parameter data used in dMIT or dMRT calculations, which may be or include temperature data, gas composition data, and/or resin property data.

Preferably step (a) also includes the step of generating a limiting value of the stickiness control temperature.

If a single AE sensor is used, its preferred location is typically on the reactor wall near the position of a temperature sensor used to monitor the bed temperature (to provide bed temperature data for calculating stickiness control temperatures, e.g., to determine the predetermined relation between values of acoustic energy in the reactor and stickiness control temperature values). Such an AE sensor position provides the best correlation between the AE readings and the stickiness control temperature values (e.g., dMIT values) calculated in response to the bed temperature measurements. In some embodiments, the bed control temperature sensor is located at an elevation of about one-half of the bed height and the AE sensor is located at or within two feet of this elevation.

If more than one AE sensor is used, the preferred location of at least one of them is on the reactor wall near the position of a temperature sensor used to monitor the bed temperature. The other AE sensors may be positioned at the same elevation or at different elevations.

In some embodiments in this class, AE data are used for error checking of an independently determined stickiness control temperature as follows:
- one or more AE sensors are positioned to sense acoustic emissions in the reactor (e.g., each is mounted to the reactor wall adjacent to the fluid bed or in the expanded section above the fluid bed);
- a calibration curve is obtained for at least one of the AE sensors (preferably for each of the AE sensors); and
- after each said calibration curve has been obtained, the reactor is operated while at least one current value of the stickiness control temperature (e.g., a current value of dMRT, dMIT, reduced melt initiation temperature, or reduced melt reference temperature, as defined herein) in the reactor is determined in on-line fashion, and at least one said calibration curve is used to check for error in the determination of each said stickiness control temperature.

To obtain each calibration curve, AE values for a location in the reactor are preferably determined from AE data measured using a subset (e.g., one) of the AE sensors at the location (e.g., a level of acoustic emissions measured by two or more of the sensors located at a single elevation in the fluid bed) while the reactor is operated over a range of operating conditions, including conditions of relatively high and low stickiness control temperature (e.g., relatively high and low dMIT). An expected stickiness control temperature for the location is determined for each operating condition. The calibration curve maps the expected stickiness control temperature (for each location for each of the operating conditions) to the AE value for the location for said each of the operating conditions. For example, the calibration curve can be a curve fitted to the data plotted on the graph of FIG. 1. Preferably, the calibration curve is generated for a range of reactor operating conditions including conditions with dMIT values ranging from 15 degrees C. (or more) to 2 degrees C. (or less) below a limiting value of dMIT. It is expected that as the degree of stickiness increases within the fluid bed, the acoustic noise (and corresponding AE values) will decrease in magnitude and the dMIT values will increase.

For the purpose of constructing a calibration curve, only stickiness control temperature values (e.g., dMIT values) that are known to be accurate should be considered. That is, the calibration curve should be determined only from those stickiness control temperature values (e.g., dMIT values) that have been determined using input data (temperature, resin properties and gas compositions) known to be accurate.

The calibration curve can be used to provide error checking for on-going plant operations under one or both of steady-state and non-steady state conditions (where non-steady state operations can include transitions between production of different polymer grades) in any of a variety of ways, including the following:
- each current value of the stickiness control temperature is calculated in on-line fashion (preferably once every 5 minutes or more frequently) from monitored reaction parameter data (preferably including resin property data), and AE data are generated by reading each AE sensor at the same times that the stickiness control temperature calculations are performed;
- the AE data from each reading of each AE sensor subset are used with the calibration curve for that AE sensor subset to determine each expected stickiness control temperature for the AE sensor subset;
- each current value of the stickiness control temperature is considered valid if the magnitude of the difference between it and the corresponding expected stickiness control temperature is less than a predetermined limit of variance. The limit of variance may be taken as 10 or 20% of the current value of the stickiness control temperature. Conversely, each current value of the stickiness control temperature is considered invalid (and likely due to error-containing data) if the magnitude of the difference between it and the corresponding expected stickiness control temperature exceeds the predetermined limit of variance.

Other methods may be employed to set a predetermined limit of variance between a stickiness control temperature and a corresponding expected stickiness control temperature. For example, an alternative embodiment of the AE sensor calibration step determines not only a calibration curve but also a range of expected stickiness control temperature values for each stickiness control temperature value along the curve, and a standard deviation of expected stickiness control temperature values for each point along the curve. In this case, the predetermined limit of variance for a current value of the stickiness control temperature may be established as 2.5 to 3 times the standard deviation of the expected stickiness control temperature values corresponding to the AE value that corresponds to such current value of the stickiness control temperature.

Optionally, AE readings (obtained at the times that the stickiness control temperature calculations are performed) are filtered to minimize the effects of random variations in the AE readings and false indications of error in determination of stickiness control temperature (resulting from use of the AE data to perform error checking of calculated values of stickiness control temperature) that would otherwise occur in the absence of such filtering. Filtering techniques that will be suitable in typical embodiments are well known to those of ordinary skill in the art, and include those that implement a moving average "window" filter (with the moving average window encompassing 2 to 10 individual AE readings), or an exponentially weighted moving average (EWMA) filter (preferably with a time constant equal to 2 to 4 times the AE sampling period).

Preferably, a calibration curve for a set of AE sensors used for monitoring a reactor is repeatedly (e.g., periodically) obtained to determine if there has been any substantial drift in the sensitivity of the set of AE sensors. Drift is not known to be a problem with the types of AE sensors expected to be useful to monitor polymerization reactions (e.g., those described in the example below). However, because AE sensors are often attached to reactor walls by an adhesive there is a possibility that the strength of attachment could change with time and affect the degree of acoustic coupling of each instrument with the fluid bed. To guard against this possibility, the calibration procedure is preferably repeated after each 6 to 12 months of reactor operation. If any substantial change in calibration is noted (e.g., 5% or more), the old calibration curve is replaced with the new one.

The noted class of embodiments can provide error checking for dMIT and dMRT calculations. The error checking can indicate when error is present in the reaction parameter data used to generate current dMIT or dMRT values in on-line fashion but usually cannot determine the exact source of such error. When an error is indicated (i.e., when a sufficiently large deviation occurs between a calculated dMIT value and an expected dMIT value corresponding to an AE reading), it may be due to an error in temperature measurement, pluggage in gas sampling lines, a failure of the process gas GC, an error (or delay) in density measurement, and/or other factors. The invention can provide a warning to operators that errors may be present in a dMIT calculation due to one or more of these factors.

Some embodiments of the inventive method employ AE sensors positioned at multiple locations in a reactor system (e.g., multiple elevations along a fluid bed) to detect localized excursions in current values of dMIT (or another stickiness control temperature) for a polymerization reaction. It is well known that conditions within a gas phase reactor are not uniform. In particular, temperature and comonomer concentration can vary with position (e.g., elevation) in the fluidized bed. These non-uniformities are especially pronounced when the reactor is run at high specific rates (i.e., with a high production rate per unit of reactor volume, or high "space-time yield", STY). Such high rate conditions can induce pronounced variations in temperature (e.g., 1-5 degrees C.) and gas phase concentrations (e.g., 5-10%) between the upper and lower sections of a fluid bed. These changes are enough to cause variations of dMIT of 3-8 degrees C. between the bottom and top of the fluid bed. With such large variations in dMIT between different regions in a fluid bed, it is possible that one (worst case) section of the bed will reach limiting stickiness before a limiting stickiness condition is reached in the bed as a whole.

Employing multiple AE probes at different locations (e.g., different elevations along a fluid bed) provides the ability to detect localized conditions of high stickiness (or risk or imminence thereof) that may exist at any of those locations. This is important because conditions of high stickiness may exist only locally, and be undetectable by a single, "global" stickiness monitor (where "global" stickiness monitor denotes one based on a single-location measurement of global diluent gas concentration). The ability to detect localized values of resin stickiness in accordance with preferred embodiments of the present invention enables reactor operators to take corrective action before a stickiness limit (e.g., a limiting dMIT value) is exceeded at any of multiple locations in a reactor, e.g., to prevent formation of sheets or occurrence of another discontinuity event.

Preferred embodiments provide location-specific monitoring of risk or imminence of stickiness without requiring the use of an independent gas analyzer for each location. Instead, they employ only relatively simple and inexpensive AE sensors at each location and readings from these sensors in combination with a single "global" stickiness monitor.

Some embodiments employ AE sensors at multiple (e.g., from 2 through 10) locations in a fluid bed reactor system, preferably at different elevations along the fluid bed. Preferred locations for the AE sensors include the lower section of the bed (e.g., at elevations of between 0.05 to 0.5 reactor diameters above the distributor plate), the middle section of the bed (e.g., at elevations of between 1.0 and 2.0 reactor diameters above the distributor plate), the upper section of the bed (e.g., at elevations of between 0.2 and 1.0 reactor diameters below the upper operating level of the fluid bed), and in the disengaging zone (e.g., at elevations of between 0.05 to 0.5 reactor diameters above the operating level of the fluid bed). In these embodiments a calibration curve is obtained for each AE sensor to relate an AE reading from the sensor to an expected stickiness control temperature value, e.g., for use in checking a stickiness control temperature value determined by a global stickiness monitor. Preferably, each calibration curve is generated for a range of reactor operating conditions including conditions with dMIT values ranging from 15 degrees C. (or more) to 1 degree C. (or less) below a limiting value of dMIT. It is expected that as the degree of stickiness increases within the fluid bed, acoustic noise (and corresponding AE values) will decrease in magnitude and dMIT values will increase.

For each AE sensor (in multiple AE sensor embodiments) the AE readings that correspond to stickiness control temperatures nearest the limiting stickiness control temperature as determined by the sensor's calibration curve (e.g., those obtained with the reactor operating within 1 degree C. of a limiting dMIT value) are particularly important. In preferred embodiments, an AE value that corresponds to the limiting stickiness control temperature (as determined by the sensor's calibration curve) or a stickiness control temperature near to the limiting stickiness control temperature (e.g., 1 degree C. less than a limiting dMIT value) is considered to be a limiting AE value ($AE_{lim}$). Each AE sensor typically has its own individual value of $AE_{lim}$. The limiting value for each sensor (sensor i) will be designated as $AE_{lim}(i)$.

After obtaining a calibration curve and an $AE_{lim}$ value for each AE sensor, the sensors are used to monitor local stickiness levels in the fluid bed. Non-sticking conditions are indicated if all AE readings are higher than their corresponding limiting values, $AE_{lim}(i)$. Conditions approaching the stickiness limit are indicated by the approach of one or more of the individual AE readings to their corresponding limiting values. Conditions exceeding limiting stickiness are indicated if at least one of the individual AE readings is lower than its corresponding limiting value.

Below (with reference to FIGS. 5-7 and Equations 1-15), we shall describe exemplary embodiments of the invention which use dry MRT values to determine reference stickiness control temperatures, and in which each dry MRT value is a dry melt initiation temperature ("dry MIT") determined graphically as the onset of rapid melting in a first or second melt DSC curve determined from a DSC measurement on a dry sample of polymer resin of the type produced in the relevant reaction. In these exemplary embodiments, the reduced melt reference temperature is a reduced melt initiation temperature ("$MIT_R$") that is at least substantially equal to the difference between the dry MIT and a melt reference temperature depression value, "D," where D is a temperature by which the dry MIT is depressed by the presence of diluent (e.g., condensable diluent gas or gases) with the resin in the reactor. The exemplary embodiments also include the step of determining a stickiness control temperature (sometimes referred to herein as "dMIT" value) at least substantially equal to $MIT_R$–Trx (or Trx–$MIT_R$), where Trx is current reactor temperature. In the exemplary embodiments, reference stickiness control temperatures are generated in accordance with the invention by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model (e.g., a MIT depression model that implements the Flory equation). The processing can be performed in any of a variety of ways, including by accessing at least one database or look-up table prepared in accordance with the model. In the exemplary embodiments, a dry melt reference temperature is determined from measured process data (using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

FIG. 6 illustrates the effect of dissolved hydrocarbons in shifting (or "displacing" or "depressing") a polymer melt curve. The effect of these dissolved components, principally dissolved comonomer and ICA, is assumed in the present work to displace the entire melt curve (shown in FIG. 5 and also shown as a dashed curve in FIG. 6) towards lower temperatures, resulting in the displaced curve indicated in FIG. 6. The polymer peak melting temperature is displaced downwards, along with the MIT. The amount of displacement is denoted as D (in units of temperature, ° C.), and in the exemplary embodiments to be described below is calculated using the Flory equation and appropriate data (or correlations) for the solubility of condensable hydrocarbons in the polymer. The displaced (reduced) value of MIT is denoted as $MIT_R$.

FIG. 7 illustrates a calculation of the stickiness control temperature dMIT=$\Delta$MIT in accordance with the exemplary embodiments to be described below. This parameter is computed as dMIT=$\Delta$MIT=Trx−$MIT_R$, and represents the extent by which the reactor bed temperature exceeds (or "overlaps") the displaced (reduced) value of the MIT. The physical units of dMIT are temperature, in degrees C. The dMIT incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of dMIT correspond to limiting values of stickiness, and may be different for different catalyst systems. For polymers produced with Catalyst A (a metallocene catalyst described below) the limiting value of dMIT was determined to be in the range of 6 to 7° C.

In exemplary embodiments of the present invention, the stickiness control temperature is determined by a method including a step of determining an estimated degree of depression of a dry melt initiation temperature for a polymer resin due to presence of at least one diluent (e.g., ICA, comonomer, and at least one isomer of the comonomer) with the resin in a reactor during a polymerization reaction, from at least one parameter of the reaction and using a predetermined melt initiation temperature depression model (e.g., one based on and implementing the Flory equation). As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined from the dry melt initiation temperature. Such a model (sometimes referred to herein as a melt initiation temperature depression model or MIT depression model) can be readily programmed into a stand-alone computer or a conventional plant DCS system to provide an on-line monitor of combinations of process conditions that lead to resin stickiness.

The noted embodiments assume that a dry melt initiation temperature for a polymer resin being produced is known, or include a step of determining such dry melt initiation temperature, preferably by characterizing a DSC (differential scanning calorimetry) melting curve for a dry version of the resin being produced. The embodiments estimate the amount by which the dry melt initiation temperature is depressed due to the presence of condensable diluent component(s) actually present with the resin being produced in the reactor. In characterizing such a DSC melting curve, an inflection point in the DSC melting curve is typically identified as the dry melt initiation temperature (MIT). Using the Flory equation, these embodiments determine a reduced melt initiation temperature ($MIT_R$) at which the resin in the reactor will begin to melt in the presence of the condensable diluent gases (e.g., soluble hydrocarbons) that are present with the resin during the reaction. The reduced melt initiation temperature, $MIT_R$, is at least substantially equal to MIT−D, where MIT is the dry melt initiation temperature, and D is an estimated degree of MIT depression, caused by the highly soluble diluent gas components in the reactor.

The methodology for estimating the depression "D" of the dry melt initiation temperature is based on the Flory equation and existing models for vapor solubility in the polymer resin. The noted embodiments typically determine a single calculated parameter, dMIT, which is the difference between the reactor temperature, Trx, and $MIT_R$, to quantify the degree to which the reactor temperature overlaps the (depressed) melting curve and thus quantify the degree of resin stickiness.

The expression "DSC melting curve" for dry version of polymer resin herein denotes an experimentally determined relationship between the rate at which heat is absorbed by a sample of the dry resin (e.g., in units of mcal/sec) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sampled is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

As noted above, some embodiments of the inventive method include a step of controlling a polymerization reaction in response to a determined stickiness control temperature value, typically in an effort to prevent (and preferably to prevent) the occurrence of sheeting or another discontinuity event. In some cases, this is done by controlling the reaction to in an effort to maintain a current value of dMIT in a predetermined relationship with a predetermined limiting temperature value or range of values. For some embodiments in which the reaction is a polyethylene polymerization reaction using a metallocene catalyst to be referred to as Catalyst A (described below), and the reaction is controlled using stickiness control temperature values dMIT. Such values of stickiness control temperature dMIT have been correlated with measured data characterizing the same type of polyethylene polymerization reaction (performed using Catalyst A). The data characterized several wall and dome sheeting incidents that occurred during the reaction, as well as normal operation that occurred without sheeting. The correlation determined that when the dMIT value exceeded a critical value (determined to be in the range 6° C. to 7° C.), the likelihood of sheeting increased significantly. The correlation also determined that maintaining the dMIT value below this critical value is critical to avoid both wall and dome sheeting during a reaction of the type analyzed. Thus, in the noted embodiments the reaction is preferably controlled to maintain (or attempt to maintain) the reaction parameters so that dMIT is in a predetermined limiting range from 5° C. to 6° C. (or less than a predetermined limiting value from 6° C. to 7° C.).

For some other polyethylene polymerization reactions using a catalyst other than above-noted Catalyst A, the reactions are controlled using stickiness control temperature values dMIT, by maintaining (or attempting to maintain) the reaction parameters so that dMIT is in a predetermined limiting range which is found (in commercial experience) to be appropriate for that catalyst. With these other catalyst systems the range of dMIT values required to avoid excessive resin stickiness may be different than 5° C. to 6° C. The limiting dMIT values (or range of values) for these catalysts are taken as those that are found to correlate with discontinuity events (sheeting, chunking and/or rapid fouling of the distributor plate) with the particular catalyst in a commercial reactor system.

We next describe an example of performance of above-described step (iii) to determine a reference stickiness control temperature, assuming that a dry melt initiation temperature value has been determined in step (ii). From thermodynamic considerations, the presence of a soluble, condensable substance (e.g., a hydrocarbon) reduces the melting temperature of a polymer. A relationship, known as the Flory equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi \phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.),
$T_m^0$ is the peak melting temperature of the polymer without diluent (° C.),
$\Delta Hu$ is the enthalpy of fusion for the polymer repeat unit (850.6 cal/mol),
$\phi_1$ is the volume fraction of diluent (single or multi-component), and
$\chi$ is a binary interaction parameter.

The parameter $\chi$ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:
$\delta_1$ is the solubility parameter of the diluent, and
$\delta_2$ is the solubility parameter of the polymer.
For a diluent that is a mixture of gases:

$$\delta_1 = \delta_{mix} = \Sigma \delta_i \cdot f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate $\chi$ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs} \cdot (\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m$ is the peak melt temperature expected for the polymer in the presence of the diluent. From thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as $$MIT_R = MIT - D \quad (6)$$

In the example, the temperature value generated in step (d) is a temperature value dMIT=Trx-$MIT_R$, where Trx is the current reactor temperature, and $MIT_R$ is given by Equation 6. The value dMIT is the difference between the reactor temperature (Trx) and the melt initiation temperature of the polymer, accounting for the depression in melting point for soluble hydrocarbons. A positive value of dMIT indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:
Kp is the Henry's Law constant,
ω is an acentric factor,
Tc is the critical temperature of the diluent (° K), and
T is the temperature (° K).

To calculate the vapor solubility, the following equation was presented by Stiel, et al, (cited above):

$$Py_1 = Kp \cdot V_1^0 \quad (8)$$

where:
P is the reactor total pressure (atm),
$y_1$ is vapor phase mole fraction, and
$V_1^0$ is vapor solubility in cm³ diluent/g polymer at 273.2° K and 1 atmosphere pressure.

By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where:
Ta is 273.15 (° K),
R is the gas constant (82.06 cm³·atm/mol·° K), and
Mw is the molecular weight of the diluent,
or:

$$S = P \cdot Mw \cdot \frac{\exp\left(-1.561 + (2.057 + 1.438\omega)\left(\frac{Tc}{T}\right)^2\right)}{22414.7} \quad (10)$$

If P is in units of bars (rather than atmospheres), the constant in the denominator of Equation 10 is 22710.9.

Component properties, such as Tc, ω and Mw may be found in Reid, R. C., et al., *The Properties of Gases and Liquids*, 4$^{th}$ ed., McGraw-Hill, N.Y., 1987.

To calculate the melting point depression by Equation 4, the volume fraction of diluent φ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho_p}} \quad (11)$$

where:
Ms is the mass fraction of diluent,
$\rho_s$ is the density of the diluent (in g/cm³), and
$\rho_p$ is the density of the polymer (in g/cm³)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/Trx} P^e \quad (12)$$

where MI is the polymer melt index, $I_2$ (g/10 min), ρ is the polymer density (g/cm³), Trx is the reactor temperature (in ° K.), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left(\left(b1+\frac{b2}{T}-b3\right)P\right)} e^{c/Trx}(1-\rho)^d MI^e \quad (13)$$

where (again) MI is the polymer melt index ($I_2$, g/10 min), ρ is the polymer density (g/cm³), Trx is the reactor temperature (in ° K), P is the hydrocarbon partial pressure at the resin conditions (in psia), and a, b1, c, d, and e are predetermined parameters.

In the example, diluent mixture molar volumes are required. Well known methods such as the Rackett method using the Chueh-Prauxnitz mixing rules or the Hankinson-Brobst-Thomson method for mixtures may be used. Molar volumes used herein were calculated using the modified Rackett method using the Chueh-Prausnitz mixing rules (as described in Reid, R. C., et al., *The Properties of Gases and Liquids*, 4$^{th}$ ed., McGraw-Hill, New York, 1987):

To estimate χ in Equation 4, the volume fraction of each soluble component is also required. In the example, the χ parameter was computed by modifying Equation 2 as follows:

$$\chi = 0.34 + \frac{V_1}{RT_{rx}}\left(\sum_i \delta_i \frac{S_i}{\sum_i S_i} - \delta_P\right) \quad (14)$$

where:
$\delta_p$ is polymer solubility parameter,
$\delta_i$ is the solubility parameter of diluent component i,
$S_i$ is defined by Equation 10, and
The temperature T is taken as Trx.

In the example, melt DSC measurements were made for a series of polymers (produced with a variety of catalysts) before step (b) was performed. Table 1 shows the melt index (MI) and density (ρ) of each polymer, the catalyst employed to produce the polymer (and included with the polymer sample measured), and the melt initiation temperature and peak melt temperature determined for the polymer. The density of the polymers ranged from 0.909 to 0.966 g/cm³ and their melt indices ranged from 0.81 to 19.0 g/10 min.

In Table 1 and elsewhere herein polymer density refers to density measured in accordance with ASTM 1505 and ASTM D-1928. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in PCT Application Publication Number WO9639450A1 (published on Dec. 12, 1996). PCT Application Publication No. WO9639450A1 teaches (on page 15-16) the following method for preparing this catalyst from 600° C. silica having a water content of 1.3 weight percent (Davison 948 silica, available from W. R. Grace, Davison Chemical Division, Baltimore, Md.): The metallocene catalyst was prepared by mixing 850 pounds (386 kg) of silica with 340 pounds (154 kg) of a catalyst precursor. The catalyst precursor was separately prepared by mixing together 82 pounds (37 kg) of a 28 weight percent solution of bis(1-methyl-3-n-butylcyclopentadienyl) zirconium dichloride in toluene with 1060 pounds (481 kg) of a percent 30 percent by weight solution of methylalumoxane available from Albemarle Corporation, Baton Rouge, La.). An additional 1300 pounds (590 kg) of toluene were added and the mixture held at 80° F. (27° C.) for 1 hour after which 6 pounds (3 kg) of a surface modifier (Kemamine AS-990 available from Ciba Specialty Chemicals Corporation, Houston, Tex.) was added and allowed to mix for one hour. Vacuum was applied and the catalyst was allowed to dry for fifteen hours. It was then dried at 175° F. (79° C.) to a free flowing powder.

In Table 1 and elsewhere herein, "Catalyst B" is a metallocene catalyst described in PCT Application Publication Number WO9961486A1 (published Dec. 2, 1999). The catalyst is identified as "Catalyst D" in the publication, and is based on a "bulky ligand metallocene-type catalyst compound", dimethylsilyl-bis(tetrahydroindenyl)zirconium dichloride ($Me_2Si(H_4Ind)_2ZrCl_2$), which is available from Albemarle Corporation, Baton Rouge, La." PCT Application Publication No. WO9961486A1 teaches (page 32, line 11, to page 33, line 11) the following method for preparing this catalyst: The ($Me_2Si(H_4Ind)_2ZrCl_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis (tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine ($C_{18}H_{37}N(CH_2CH_{20}H)_2$) available as Kemamine AS-990 from Ciba Specialty Chemicals Corporation, Houston, Tex., is added together with an additional 110 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0.

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum (AlEt3) at 60° C. in isopentane, solvent is removed and the resulting product is dried. In the second step, a solution of MgCl2 and TiCl3.1/3AlCl3 dissolved in THF is mixed at 60° C. with the product formed in the first step, solvent is removed and the resulting product is dried to reduce the THF concentration in the product to the range of 0.13 to 0.15. In the third step, the product formed in the second step is reacted with Et2AlCl and Al(n-hexyl)3 at 60° C. in isopentane, the solvent is removed and the product is dried. The quantity of Et2AlCl used in the third step is such that the molar ratio of Et2AlCl/THF is 0.50. The quantity of Al(n-hexyl)3 used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

TABLE 1

| Catalyst | Melt Init. Temp (° C.) | Peak Melt Temp (° C.) | Melt Index (dg/min, ASTM) | Density (g/cc, ASTM) |
|---|---|---|---|---|
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 5.

It is contemplated that in alternative embodiments, a dry MIT (or other dry MRT) for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. In the exemplary embodiments, the inflection point of the DSC curve for each polymer is considered to be the dry melt initiation temperature (dry MIT) value for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.7524 \ln(MI) - 606.09 \quad (15)$$

where $\rho$ represents the density of the polymer (in units of g/cc, ASTM), and MI represents the melt index, $I_2$, of the polymer (in units of dg/min, ASTM).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e. other than Catalysts A, B or C) may have MIT values that do not fit the regression curve defined by Equation 15.

A version of the above-described melt initiation temperature depression model which uses Equations 4, 9, 10, and 11 has been coded into an Excel spreadsheet, for application to polymerization of polyethylene with typical condensable gas components (C4 olefins, C4 saturates, C6 olefins, C6 saturates and isopentane). Solubility parameters for these gases were obtained from the *Chemical Properties Handbook*©1999, and are listed in Table 2 below. A value for the of solubility parameter of polyethylene was obtained from an average of several values that are listed for polyethylene in the *Polymer Handbook*, 4th ed.

TABLE 2

| Solubility Parameters $((cal/cm^3)^{1/2})$ | |
| --- | --- |
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min (ASTM), and a density of 0.918 g/cc (ASTM), being produced in a fluid bed reactor. The calculation was based on assumed values of condensable diluent gas concentrations, temperature, and pressure (as provided in the table) that are believed to be representative of Catalyst A in commercial operation.

TABLE 3

| | |
| --- | --- |
| 1-Hexene partial pressure (bar) | 0.217 |
| Isopentane partial pressure (bar) | 3.45 |

TABLE 3-continued

| | |
| --- | --- |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| $\Delta$MIT, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$ was determined as the difference MIT−D, which produced an estimated value of 81.71° C. Since this was lower than the reactor temperature (Trx) of 85° C., the calculation thus determined that (this example) system was operating with a positive value of dMIT equal to 3.38° C. Since this was less than the limiting range of dMIT values that apply for Catalyst A (5 to 6° C.), the reactor system would be expected to operate at the conditions above without excessive resin stickiness in the fluidized bed and, consequently, without an increased tendency for discontinuity events such as sheeting, chunking or distributor plate fouling caused by excessive stickiness.

Embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments also allow reactor production rates to be safely maximized while minimizing the potential for discontinuity events, and allow production rates to be maximized (i.e., to proceed with maximum combinations of reactor temperature and ICA) while avoiding the conditions in the reactor (or combinations of conditions) that would lead to excessive stickiness and discontinuity events. These embodiments use only readily available process and resin property data.

Several variations (or improvements) of the described examples of the inventive method are contemplated:
  other solubility correlations for condensing and comonomers can be employed;
  other methods to predict (possibly more accurately) mutual solubilities in multi-component systems can be employed;
  improved enthalpy of fusion values ($\Delta$Hu) can be employed to account for variation of $\Delta$Hu with polymer density. (It has been reported in the literature that $\Delta$Hu is a function of the polymer density); and
  dilatometry data can be used to predict (possibly more accurately) the polymer and diluent volume fractions.

The inventors have appreciated the importance of isomeric compounds (isomers of comonomers) present in fluid bed polymerization reactors, in monitoring and optionally also controlling polymerization reactions occurring in the reactors (e.g., polyethylene polymerization reactions under metallocene catalyst polymerization conditions). Such isomeric compounds are relatively inert and accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a substantial impact of the melting point depression D and the reduced melt reference temperature $MRT_R$. Preferred embodiments of the invention recognize and account for the impact of accumulated isomers on the melting point depression D, and the resulting values of $MRT_R$ and dMRT. Procedures to remedy the effects of accumulated isomers (such as controlled venting of the reactor as described below) are preferably also implemented.

Whatever method is employed to determine a dry melt reference temperature and reduced melt reference temperature in accordance with some embodiments of the invention, it is important to ensure that a consistent method is used throughout the calculations, and that appropriate limits for dMRT or dMIT (limits that apply for the particular method of determining melt reference temperature that is employed) are established, preferably through actual operating experience. In practice, limiting values of dMIT or dMRT are typically those values that correlate with an increased tendency for sheeting, chunking, and/or distributor plate fouling.

Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use other correlations for the solubility of diluent gas components in the resin (i.e. other than those presented in the examples). The inventors contemplate that other such methods may be constructively employed, as long as they provide reasonable, engineering estimates of the diluent gas solubilities and the resulting depression of the polymer melting curve.

In preferred embodiments of the invention, all condensable components that are present in significant amounts in the cycle gas stream (including comonomer isomers) are measured and the step of determining an estimated degree of depression of dry melt reference temperature (for a dry version of the resin being produced) correctly accounts for all such significant condensable components. The significant components should include isomer(s) of each comonomer present (e.g., each comonomer that is a C6 isomer, or each comonomer that is a C3-C10 alpha olefin). It is expected that some embodiments of the invention will use a lumped isomer concentration value for determining an estimated degree of dry melt reference temperature depression that accounts (with acceptable accuracy) for the contributions of all isomers present in significant concentrations.

Accurate accounting for isomers in determination of estimated degree of dry melt reference temperature (e.g., dry melt initiation temperature) depression is expected to provide direct benefits in many if not all embodiments of the invention, including those which generate a reference stickiness control temperature based on bed-averaged parameters of steady-state reactions and use them to characterize and control the steady-state reactions, and those which generate a reference stickiness control temperature based on instantaneous reaction parameters and use them to characterize and control the reactions during reaction transitions.

A specific control action to remedy the impact of isomers (of comonomers) on dMRT is to vent isomers from the reactor/recycle system. Vented isomers may go to flare or to a recovery system separate from the reactor/recycle system of the reactor (which may be operating with a metallocene catalyst). As is well known to those skilled in the art, direct venting of the cycle gas to flare is possible, but is likely to be far from optimal due to the relatively high concentration that would also be vented in the process. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe examples of commercial-scale reactions (e.g., commercial-scale, gas-phase fluidized-bed polymerization reactions) that can be monitored and optionally also controlled in accordance with the invention. Some such reactions can occur in a reactor having the geometry of reactor 110 of FIG. 3. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows. The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by the continuous flow of make up feed and recycle gas through the reaction zone (i.e. the fluidized bed). In some implementations, a superficial gas velocity of 1 to 3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with the invention. A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed. Although there is no generally recognized method for establishing the upper limit of reactor temperature, the upper limit is believed to be related to the sintering temperature of the polymer product. Typical embodiments of the inventive method provide a quantitative means for setting the temperature limits based on the $MRT_R$ (the reduced melt reference temperature, which is typically a temperature at which the onset of melting is expected to occur in the reactor). The upper limit of reactor temperature is preferably set by a limiting value of dMRT, defined above, or a limiting value of another dMRT parameter. The limiting value of dMRT, in preferred embodiments, is the maximum amount by which the reactor temperature can exceed the $MRT_R$ without inducing excessive stickiness in the product.

In other embodiments, a reactor whose operation is monitored and optionally also controlled in accordance with the invention effects polymerization by a slurry polymerization process. A slurry polymerization process generally uses pressures in the range of from 1 to 50 atmospheres, and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert.

In other embodiments, a reaction monitored and optionally also controlled in accordance with the invention is or includes particle form polymerization, or a slurry process in which the temperature is kept below the temperature at which the polymer goes into solution. In other embodiments, a reaction monitored and optionally also controlled in accordance with the invention is a loop reactor or one of a plurality of stirred reactors in series, parallel, or combinations thereof. Non-limiting examples of slurry processes include continuous loop or stirred tank processes.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen increase the molecular weight or melt index (MI) of the polyolefin generated. The MI can thus be influenced by the hydrogen concentration. The amount of hydrogen in the polymerization can be expressed as a mole ratio relative to the total polymerizable monomer, for example, ethylene, or a blend of ethylene and hexane or propylene. The amount of hydrogen used in some polymerization processes is an amount necessary to achieve the desired MI (or molecular weight) of the final polyolefin resin. In one embodiment, the mole ratio in the gas phase of hydrogen to total monomer (H$_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor monitored and optionally also controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution, a slurry, or as a solid (preferably as a powder) with or without the catalyst system or its components.

In a reactor monitored and optionally also controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries, solutions, or solids (preferably as powders) as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor monitored and optionally also controlled in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is

1. A method for monitoring a polymer resin-producing polymerization reaction in a fluid bed reactor to determine a current value of a stickiness control temperature, including the steps of:
   (a) in on-line fashion, generating acoustic data indicative of at least one value of an acoustic condition in the reactor; and
   (b) in on-line fashion, determining a current value of the stickiness control temperature from the acoustic data and a predetermined relation between values of the acoustic condition in the reactor and values of the critical temperature, where the stickiness control temperature is a temperature indicative of a characteristic of melting behavior of polymer resin in reactor.

2. The method of claim 1, where the stickiness control temperature is indicative of a characteristic of melting behavior of polymer resin in the reactor in the presence of at least one diluent.

3. The method of claim 1, also including the step of controlling the reaction in response to the current value of the stickiness control temperature in an effort to prevent occurrence of a discontinuity event.

4. The method of claim 1, wherein the stickiness control temperature is one of a reduced melt reference temperature, $MRT_R$, and a temperature parameter $dMRT=Trx-MRT_R$, where Trx denotes current reactor temperature.

5. The method of claim 1, wherein the predetermined relation is determined before performance of step (b) by a method including the steps of:
   (c) determining reference stickiness control temperatures for a set of polymerization reactions in the reactor, wherein each of the reference stickiness control temperatures is determined from a different measured reaction parameter set indicative of one of the reactions;
   (d) identifying values of a reference acoustic condition in the reactor from measured acoustic data indicative of the polymerization reactions, where the reference acoustic condition has one of said values in the reactor during each of the reactions and each of said values corresponds to the reference stickiness control temperature in the reactor for said one of the reactions; and
   (e) determining the predetermined relation, between the values of the acoustic condition in the reactor and the values of the stickiness control temperature, from the reference stickiness control temperatures and the values of the reference acoustic condition.

6. The method of claim 5, wherein the reference stickiness control temperature is determined from a melt initiation temperature depression model that implements the Flory melt depression equation.

7. The method of claim 5, wherein step (c) determines a reference stickiness control temperature for each of the reactions, each such reference stickiness control temperature is one of the reference stickiness control temperatures recited in step (c), and step (c) includes the steps of:
   (i) generating one said measured reaction parameter set for each of the reactions, including by monitoring parameters of the reaction, including at least reactor temperature, at least one resin property of a polymer product of the reaction, and concentration of at least one condensable diluent gas in the reactor;
   (ii) determining a dry melt initiation temperatures of a dry version of the polymer product from the at least one resin property, using a predetermined correlation between resin melting temperature and said at least one resin property; and
   (iii) using a melt initiation temperature depression model to determine the reference stickiness control temperature from at least some of the parameters monitored in step (i) and the dry melt initiation temperature where said melt initiation temperature depression model identifying an estimated degree of depression of the dry melt initiation temperature due to presence of at least one diluent with the polymer product, or using a melt reference temperature depression model to determine the reference stickiness control temperatures from at least some of the parameters monitored in step (i) and the dry melt reference temperature, said melt reference temperature depression model indentifying an estimated degree of depression of the dry melt reference temperature due to presence of diluent with the polymer product.

8. The method of claim 5, wherein at least one measured reaction parameter set includes a bed temperature measured using a bed temperature sensor at a temperature sensor location spaced from the reactor wall, and step (a) includes a step of using at least one acoustic probe positioned so that the generated acoustic data are indicative of a value of an acoustic condition at the temperature sensor location.

9. The method of claim 5, wherein each said measured reaction parameter set includes measured concentration of least one induced condensing agent, at least one comonomer, and at least one isomer of the comonomer.

10. The method of claim 5, wherein the set of polymerization reactions includes a first subset and a second subset of polymerization reactions, each polymerization reaction in the first subset produces a polymer product in a first produce class, each polymerization reaction in the second subset produces a polymer product in a second product class, the predetermined relation is a first predetermined relation between values of the acoustic condition measured during the reactions in the first subset and stickiness control temperature values for such reactions, and said method also includes the steps of:
   (c) before performing step (b), determining reference stickiness control temperatures for polymerization reactions in the first subset and additional reference stickiness control temperatures for polymerization reactions in the second subset, including by determining each of the reference stickiness control temperatures from a different measured reaction parameter set indicative of one of the polymerization reactions in the first subset and each of the additional reference stickiness control temperatures from a difference measured reaction parameter set indicative of one of the polymerization reactions in the second subset;
   (d) identifying values of a reference acoustic condition in the reactor from measured acoustic data indicative of the reactions in the first subset and measured acoustic data indicative of the reactions in the second subset, where the reference acoustic condition has one of said values during each one of the reactions and each of said values corresponds to a reference stickiness control temperature for said one of the reactions;

(e) determining the first predetermined relation from the reference stickiness control temperatures and at least some of the values of the reference acoustic condition; and (f) determining a second predetermined relation, between values of the acoustic condition measured during the reactions in the second subset and stickiness control temperature values for such reactions, for the reactions in the second subset from the additional reference stickiness control temperatures and at least some of the values of the reference acoustic condition.

11. The method of claim 10, wherein the first product class consists of grades of very low density polyethylene and the second product class consists of grades of polyethylene other than very low density polyethylene.

12. The method of claim 1, wherein the polymerization reaction produces a very low density polyethylene and the current value of the thickness control temperature in the reactor is determined using a melt reference temperature depression model that accounts for crystallization kinetics of vary low density polyethylene resin.

13. A method for monitoring a polymer resin-producing polymerization reaction in a fluid bed reactor, using a predetermined relation between values of acoustic energy in the reactor and values of a stickiness control temperature for the reactor to provide error checking for determination of the stickiness control temperature, where the stickiness control temperature is a temperature indicative of a characteristic of melting behavior of the polymer resin in the reactor, said method including the steps of:

(a) in on-line fashion determining a current value of the stickiness control temperature;

(b) in on-line fashion, generating acoustic emission (AE) data indicative of an acoustic energy value in the reactor using at least one acoustic emission (AE) sensor; and (c) determining from the predetermined relation an expected value of the stickiness control temperature corresponding to the acoustic energy value, and determining whether the current value of the stickiness control temperature is consistent with the expected value of the stickiness control temperature.

14. The method of claim 13, wherein the stickiness control temperature is one of a reduced melt reference temperature, $MRT_R$, and a temperature parameter $dMRT=Trx-MRT_R$, where Trx denotes current reactor temperature.

15. The method of claim 13, wherein step (c) includes the step of asserting a warning in response to determining the current value of the stickiness control temperature is inconsistent with the expected value of the stickiness control temperature.

16. The method of claim 13, wherein step (a) includes the step of generating the current value of the stickiness control temperature in response to monitoring data indicative of at least one parameter of the reaction, including a temperature at a temperature sensor location, and the AE data generated in step (b) are indicative of an acoustic energy value at the temperature sensor location.

17. The method of claim 13, wherein step (a) also includes the step of generating a limiting value of the stickiness control temperature.

18. The method of claim 13, wherein step (b) includes the step of generating the AE data using at least two AE sensors that said AE data are indicative of an acoustic energy value at each of at least two locations in the reactor.

19. The method of claim 18, wherein the predetermined relation is between values of acoustic energy at one of the locations in the reactor and values of the stickiness control temperature at said one of the locations, and also using a second predetermined relation between values of acoustic energy at a second one of the locations in the reactor and values of the stickiness control temperature at said second one of the locations, and wherein step (c) includes the steps of:

determining from the predetermined relation an expected value of the stickiness control temperature corresponding to an acoustic energy value at said one of the locations, determining from the second predetermined relation a second expected value of the stickiness control temperature corresponding to an acoustic energy value at the second one of the locations, and determining whether the current value of the stickiness control temperature is consistent with each of the expected value of the stickiness control temperature and the second expected value of the stickiness control temperature.

20. The method of claim 19, wherein step (a) includes the step of determining a first current value of the stickiness control temperature at said one of the locations and a second current value of the stickiness control temperature at the second one of the locations.

* * * * *